United States Patent
Gan et al.

(10) Patent No.: US 11,075,717 B2
(45) Date of Patent: *Jul. 27, 2021

(54) RECEIVING STATE INDICATION METHOD FOR A-MPDU AND RECEIVE END DEVICE

(71) Applicant: Huawei Technologies Co., Ltd., Shenzhen (CN)

(72) Inventors: Ming Gan, Shenzhen (CN); Le Liu, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,368

(22) Filed: Jan. 20, 2020

(65) Prior Publication Data

US 2020/0153553 A1    May 14, 2020

Related U.S. Application Data

(63) Continuation of application No. 15/904,031, filed on Feb. 23, 2018, now Pat. No. 10,574,398, which is a
(Continued)

(30) Foreign Application Priority Data

Sep. 1, 2015 (CN) .......................... 201510551675.X

(51) Int. Cl.
*H04W 4/00* (2018.01)
*H04L 1/16* (2006.01)
(Continued)

(52) U.S. Cl.
CPC .......... *H04L 1/1614* (2013.01); *H04L 1/1621* (2013.01); *H04W 28/06* (2013.01); *H04W 72/0413* (2013.01)

(58) Field of Classification Search
CPC . H04W 28/06; H04W 72/0413; H04W 72/04; H04L 1/1614; H04L 1/1612; H04L 5/00; H04L 1/16
See application file for complete search history.

(56) References Cited

U.S. PATENT DOCUMENTS

2005/0238054 A1   10/2005   Sharma
2013/0223210 A1   8/2013   Asterjadhi et al.
(Continued)

FOREIGN PATENT DOCUMENTS

CN       1744485 A    3/2006
CN    102684852 A    9/2012
(Continued)

OTHER PUBLICATIONS

Machine Translation and Abstract of Chinese Publication No. CN103957087, Jul. 30, 2014, 21 pages.
(Continued)

*Primary Examiner* — Abdelnabi O Musa
(74) *Attorney, Agent, or Firm* — Conley Rose, P.C.

(57) ABSTRACT

A receiving state indication method for an aggregate-media access control (MAC) protocol data unit (A-MPDU) and a receiving device, to indicate a receiving state of an A-MPDU including a MAC service data unit (MSDU) fragment. The method includes receiving, by a receive end, an A-MPDU sent by a transmit end; and when determining that at least one MAC protocol data unit (MPDU) in the A-MPDU is obtained by encapsulating a fragment of an MSDU, sending, by the receive end to the transmit end, an acknowledgement frame used to indicate a receiving state of the A-MPDU, where the acknowledgement frame includes a fragment indication field and a receiving state field.

20 Claims, 17 Drawing Sheets

Related U.S. Application Data continuation of application No. PCT/CN2016/084576, filed on Jun. 2, 2016.

(51) Int. Cl.
*H04W 28/06* (2009.01)
*H04W 72/04* (2009.01)

(56) References Cited

U.S. PATENT DOCUMENTS

| | | | |
|---|---|---|---|
| 2013/0223345 | A1 | 8/2013 | Asterjadhi et al. |
| 2014/0036775 | A1 | 2/2014 | Asterjadhi et al. |
| 2014/0079016 | A1* | 3/2014 | Dai .................. H04W 72/0446 370/330 |
| 2014/0286246 | A1 | 9/2014 | Bao et al. |
| 2015/0098461 | A1* | 4/2015 | Trainin ................. H04L 1/1887 370/338 |
| 2016/0182205 | A1* | 6/2016 | Asterjadhi ............ H04L 1/1685 370/329 |
| 2016/0302229 | A1* | 10/2016 | Hedayat ................ H04L 1/1685 |
| 2018/0219589 | A1 | 8/2018 | Kim et al. |
| 2018/0263047 | A1* | 9/2018 | Kim ...................... H04L 5/0053 |
| 2018/0359761 | A1 | 12/2018 | Chun et al. |

FOREIGN PATENT DOCUMENTS

| | | |
|---|---|---|
| CN | 102771059 A | 11/2012 |
| CN | 103957087 A | 7/2014 |
| CN | 104704876 A | 6/2015 |
| CN | 104065452 A | 9/2017 |
| EP | 3313012 A1 | 4/2018 |
| JP | 2014502453 A | 1/2014 |
| JP | 2015508981 A | 3/2015 |
| JP | 2018506881 A | 3/2018 |
| KR | 20130087561 A | 8/2013 |
| WO | 2016105515 A1 | 6/2016 |

OTHER PUBLICATIONS

Machine Translation and Abstract of Chinese Publication No. CN104065452, Sep. 24, 2014, 28 pages.
Asterjadhi, A., et al., LB 200 Comment Resolution for Clause 83.5.1.5; XP068063456, IEEE 802.11-13/1427r0, Nov. 13, 2013, 6 pages.
Chung, C., et al., "A-MPDU using Fragmented MPDUs for IEEE 802.11ac MU-MIMO WLANs," IEEE International Conference of IEEE Region 10 (TENCON 2013), Oct. 25, 2013, 6 pages.
Foreign Communication From a Counterpart Application, Korean Application No. 10-2018-7003392, Korean Office Action dated Aug. 19, 2019, 6 pages.
Foreign Communication From a Counterpart Application, Korean Application No. 10-2018-7003392, English Translation of Korean Office Action dated Aug. 19, 2019, 4 pages.
Foreign Communication From a Counterpart Application, Chinese Application No. 201510551675.X, Chinese Office Action dated Apr. 24, 2019, 7 pages.
Foreign Communication From a Counterpart Application, European Application No. 16840643.7, Extended European Search Report dated Jul. 25, 2018, 11 pages.
Foreign Communication From a Counterpart Application, PCT Application No. PCT/CN2016/084576, English Translation of International Search Report dated Aug. 26, 2016, 2 pages.
Foreign Communication From a Counterpart Application, Japanese Application No. 2018-529700, Japanese Office Action dated Mar. 12, 2019, 6 pages.
Foreign Communication From a Counterpart Application, Japanese Application No. 2018-529700, English Translation of Japanese Office Action dated Mar. 12, 2019, 6 pages.

\* cited by examiner

| Bit | 4 | 1 | 2 | 1 | 8 |
|---|---|---|---|---|---|
| | Traffic identifier (TID) | End of Service Period indication bit/ reserved (EOSP/ reserved) | Acknowledgement policy (ACK policy) | A-MSDU present/reserved (present/ reserved) | Transmit opportunity limit field/queue size field/reserved field (TXOP limit/Queue size/reserved) |

RECEIVING STATE INDICATION METHOD FOR A-MPDU AND RECEIVE END DEVICE

CROSS-REFERENCE TO RELATED APPLICATIONS

This application is a continuation of U.S. patent application Ser. No. 15/904,031, filed on Feb. 23, 2018, which is a continuation of International Patent Application No. PCT/CN2016/084576, filed on Jun. 2, 2016, which claims priority to Chinese Patent Application No. 201510551675.X, filed on Sep. 1, 2015. All of the aforementioned patent applications are hereby incorporated by reference in their entireties.

TECHNICAL FIELD

The present disclosure relates to the communications field, and in particular, to a receiving state indication method for an aggregate-media access control (MAC) protocol data unit (A-MPDU) and a receiving device.

BACKGROUND

A fragmentation technology is introduced in the 802.11b protocol that supports low rate data transmission. The so-called fragmentation technology means that a MAC service data unit (MSDU) or a MAC management protocol data unit (MMPDU) is split into multiple segments at a MAC layer, and each segment is referred to as a fragment of the MSDU or the MMPDU. When receiving of a fragment fails, only the fragment that fails to be received is allowed to be retransmitted in the fragmentation technology, and there is no need to retransmit the entire MSDU or MMPDU, thereby improving robustness and a throughput rate of a network.

To support a higher data transmission rate, an A-MPDU technology is introduced in the 802.11n protocol. The A-MPDU technology means that an MSDU or an aggregate-MSDU (A-MSDU) is encapsulated to obtain a MAC protocol data unit (MPDU), and multiple MPDUs are transmitted in an aggregate manner. Aggregated MPDUs are distinguished using MPDU delimiters. In one A-MPDU, a maximum of 64 encapsulated MSDUs are allowed to aggregate for transmission. In the A-MPDU technology, a receiving state of an A-MPDU is fed back using a block acknowledgement (BA) frame. Each bit in a BA bitmap included in the BA frame correspondingly indicates a receiving state of one MSDU or A-MSDU. A first bit in the BA bitmap correspondingly indicates a receiving state of an MSDU with a first sequence number (SN) in a BA starting sequence control field, and so on.

In the 802.11ax protocol in a new generation wireless local area network (WLAN) system, an orthogonal frequency division multiple access (OFDMA) technology is introduced. Multiple users who use the OFDMA technology transmit data on different subchannels. As shown in FIG. 1, multiple stations (STAs) transmit A-MPDUs on corresponding subchannels. Each MPDU in the A-MPDUs is obtained by encapsulating one MSDU or one A-MSDU, and cannot be obtained by encapsulating a fragment of an MSDU. The multiple STAs use pad bits to enable data transmitted by the multiple STAs to align in terms of time. Then, a resource occupied by the pad bit may be used to transmit a fragment of an MSDU or an A-MSDU in order to improve transmission efficiency. Therefore, the new generation WLAN system needs to support both the MSDU fragmentation technology and the A-MPDU technology. That is, an MPDU in an A-MPDU may be obtained by encapsulating an MSDU or an A-MSDU, or may be obtained by encapsulating an MSDU fragment or an A-MSDU fragment. For ease of description, an MSDU fragment in the following description may also be understood as an A-MSDU fragment.

Because an existing compressed BA frame can only indicate a receiving state of an A-MPDU including MPDUs obtained by encapsulating only MSDUs, and cannot indicate a receiving state of an A-MPDU including an MPDU that is obtained by encapsulating an MSDU fragment in the new generation WLAN system. Currently, a receiving state of an A-MPDU including an MPDU obtained by encapsulating an MSDU fragment in the new generation WLAN system can be indicated using the following two solutions. However, there are some disadvantages, and details are as follows.

Solution 1: A manner of allocating an SN of an MSDU is changed.

A unique SN is allocated to an MSDU or an MSDU fragment. In this way, different fragments of a same MSDU no longer have a same SN, and have respective SNs. Two bits in a sequence control field of an MPDU are used to indicate MSDU fragments that belong to a same MSDU. Each bit in a compressed BA frame is used to indicate a receiving state of an MSDU or an MSDU fragment corresponding to one SN. Therefore, a receive end indicates a receiving state of an A-MPDU by sending a compressed BA frame to a transmit end. In solution 1, an existing manner of allocating an SN of an MSDU is changed, and the solution is relatively complex. Once an indication of bits used to indicate MSDU fragments that belong to a same MSDU is incorrect, a receiver incorrectly considers that fragments coming from multiple MSDUs belong to a same MSDU.

Solution 2: A quantity of fragments of a same MSDU is restricted in an A-MPDU.

It is stipulated that one A-MPDU may include fragments of multiple MSDUs, but one A-MPDU can include only one fragment of a same MSDU. In this way, each bit in a compressed BA frame can indicate a receiving state of an MSDU or an MSDU fragment according to an SN sequence. Therefore, a receive end indicates a receiving state of an A-MPDU by sending a compressed BA frame to a transmit end. Therefore, in solution 2, multiple fragments of a same MSDU are not allowed to aggregate in one A-MPDU for transmission.

In conclusion, a receiving state of an A-MPDU including an MSDU fragment cannot be well indicated using existing solutions, and the existing solutions have some disadvantages.

SUMMARY

The present disclosure provides a receiving state indication method for an A-MPDU, a receiving state indication method for an MSDU fragment, a receiving device, and a sending device in order to indicate a receiving state of an A-MPDU including an MSDU fragment.

Specific technical solutions provided in the embodiments of the present disclosure are as follows.

According to a first aspect, an embodiment of the present disclosure provides a receiving state indication method for an A-MPDU, including receiving, by a receive end, an A-MPDU sent by a transmit end, and sending, by the receive end to the transmit end, an acknowledgement frame used to indicate a receiving state of the A-MPDU when at least one MPDU in the A-MPDU is obtained by encapsulating a fragment of an MSDU, where the acknowledgement frame includes a fragment indication field and a receiving state field, where the fragment indication field is used to indicate that the A-MPDU includes an MPDU obtained by encapsulating an MSDU fragment, the receiving state field is used to indicate a receiving state of each MPDU in the A-MPDU, a specified bit quantity of bits in the receiving state field is used to indicate receiving states of MPDUs with a same SN, and each bit in the receiving state field is used to indicate one MPDU in a sequence of SNs in the A-MPDU.

With reference to the first aspect, in a first possible implementation manner, determining, by the receive end, that at least one MPDU in the A-MPDU is obtained by encapsulating a fragment of an MSDU includes determining, by the receive end, that at least one MPDU in the A-MPDU is obtained by encapsulating a fragment of an MSDU when a fragment number (FN) field included in at least one MPDU in the A-MPDU includes not only 0.

With reference to the first aspect, in a second possible implementation manner, when the acknowledgement frame uses a frame format of a multi-user BA (M-BA) frame, the fragment indication field uses the form that the fragment indication field includes one or more bits of four reserved bits in a starting sequence control field in a BA information field in the M-BA frame, or the fragment indication field includes one or more bits in a traffic identifier (TID) field in the M-BA frame.

With reference to the first aspect, in a third possible implementation manner, when the acknowledgement frame uses a frame format of a compressed BA frame, the fragment indication field uses the form that the fragment indication field includes one or more bits of four reserved bits in a starting sequence control field in a BA information field in the compressed BA frame, the fragment indication field includes one or more bits in a TID field in a BA control field in the compressed BA frame, the fragment indication field includes one or more bits of eight reserved bits in a BA control field in the compressed BA frame, or the fragment indication field includes a Multi-TID bit, a compressed bitmap bit, and a Groupcast with Retries (GCR) bit in a BA control field in the compressed BA frame.

With reference to the first aspect, in a fourth possible implementation manner, for the bits in the receiving state field that are used to indicate the receiving states of the MPDUs with the same SN, the specified bit quantity of the bits is greater than or equal to a maximum value of an allowed quantity of MSDU fragments.

According to a second aspect, an embodiment of the present disclosure provides a receiving device, including a receiving unit configured to receive an A-MPDU sent by a sending device, a determining unit configured to determine an acknowledgement frame used to indicate a receiving state of the A-MPDU when at least one MPDU in the A-MPDU received by the receiving unit is obtained by encapsulating a fragment of an MSDU, and a sending unit configured to send the acknowledgement frame determined by the determining unit to the sending device, where the acknowledgement frame includes a fragment indication field and a receiving state field, where the fragment indication field is used to indicate that the A-MPDU includes an MPDU obtained by encapsulating an MSDU fragment, the receiving state field is used to indicate a receiving state of each MPDU in the A-MPDU, a specified bit quantity of bits in the receiving state field is used to indicate receiving states of MPDUs with a same SN, and each bit in the receiving state field is used to indicate one MPDU in a sequence of SNs in the A-MPDU.

With reference to the second aspect, in a first possible implementation manner, when at least one MPDU in the A-MPDU received by the receiving unit is obtained by encapsulating a fragment of an MSDU, the determining unit is further configured to determine that at least one MPDU in the A-MPDU is obtained by encapsulating a fragment of an MSDU when an FN field included in at least one MPDU in the A-MPDU includes not only 0.

With reference to the second aspect, in a second possible implementation manner, when the acknowledgement frame uses a frame format of an M-BA frame, the fragment indication field uses the form that the fragment indication field includes one or more bits of four reserved bits in a starting sequence control field in a BA information field in the M-BA frame, or the fragment indication field includes one or more bits in a TID field in the M-BA frame.

With reference to the second aspect, in a third possible implementation manner, when the acknowledgement frame uses a frame format of a compressed BA frame, the fragment indication field uses the form that the fragment indication field includes one or more bits of four reserved bits in a starting sequence control field in a BA information field in the compressed BA frame, the fragment indication field includes one or more bits in a TID field in a BA control field in the compressed BA frame, the fragment indication field includes one or more bits of eight reserved bits in a BA control field in the compressed BA frame, or the fragment indication field includes a Multi-TID bit, a compressed bitmap bit, and a GCR bit in a BA control field in the compressed BA frame.

With reference to the second aspect, in a fourth possible implementation manner, for the bits in the receiving state field that are used to indicate the receiving states of the MPDUs with the same SN, the specified bit quantity of the bits is greater than or equal to a maximum value of an allowed quantity of MSDU fragments.

According to a third aspect, an embodiment of the present disclosure provides a receiving device, including a transceiver configured to receive an A-MPDU sent by a sending device, and a processor configured to determine an acknowledgement frame used to indicate a receiving state of the A-MPDU when at least one MPDU in the A-MPDU received by the transceiver is obtained by encapsulating a fragment of an MSDU, where the transceiver is further configured to send the acknowledgement frame determined by the processor to the sending device, and the acknowledgement frame includes a fragment indication field and a receiving state field, where the fragment indication field is used to indicate that the A-MPDU includes an MPDU obtained by encapsulating an MSDU fragment, the receiving state field is used to indicate a receiving state of each MPDU in the A-MPDU, a specified bit quantity of bits in the receiving state field is used to indicate receiving states of MPDUs with a same SN, and each bit in the receiving state field is used to indicate one MPDU in a sequence of SNs in the A-MPDU.

With reference to the third aspect, in a first possible implementation manner, when at least one MPDU in the A-MPDU is obtained by encapsulating a fragment of an MSDU, the processor is further configured to determine that at least one MPDU in the A-MPDU is obtained by encapsulating a fragment of an MSDU when an FN field included in at least one MPDU in the A-MPDU includes not only 0.

With reference to the third aspect, in a second possible implementation manner, when the acknowledgement frame uses a frame format of an M-BA frame, the fragment indication field uses the form that the fragment indication field includes one or more bits of four reserved bits in a starting sequence control field in a BA information field in the M-BA frame, or the fragment indication field includes one or more bits in a TID field in the M-BA frame.

With reference to the third aspect, in a third possible implementation manner, when the acknowledgement frame uses a frame format of a compressed BA frame, the fragment indication field uses the form that the fragment indication field includes one or more bits of four reserved bits in a starting sequence control field in a BA information field in the compressed BA frame, the fragment indication field includes one or more bits in a TID field in a BA control field in the compressed BA frame, the fragment indication field includes one or more bits of eight reserved bits in a BA control field in the compressed BA frame, or the fragment indication field includes a Multi-TID bit, a compressed bitmap bit, and a GCR bit in a BA control field in the compressed BA frame.

With reference to the third aspect, in a fourth possible implementation manner, for the bits in the receiving state field that are used to indicate the receiving states of the MPDUs with the same SN, the specified bit quantity of the bits is greater than or equal to a maximum value of an allowed quantity of MSDU fragments.

According to a fourth aspect, an embodiment of the present disclosure provides a receiving state indication method for an A-MPDU, including receiving, by a receive end, an A-MPDU sent by a transmit end, and sending, by the receive end to the transmit end, an acknowledgement frame used to indicate a receiving state of the A-MPDU, where the acknowledgement frame includes a BA bitmap field, and each bit in the BA bitmap field is used to indicate a receiving state of one MPDU in the A-MPDU.

With reference to the fourth aspect, in a first possible implementation manner, the acknowledgement frame further includes an A-MPDU identification field, and the A-MPDU identification field is used by the transmit end to distinguish between the A-MPDU and another A-MPDU sent by the transmit end.

With reference to the first possible implementation manner of the fourth aspect, in a second possible implementation manner of the fourth aspect, the A-MPDU identification field includes an SN and an FN that are included in a first MPDU in the A-MPDU.

According to a fifth aspect, an embodiment of the present disclosure provides a receiving device, including a receiving unit configured to receive an A-MPDU sent by a sending device, a determining unit configured to determine an acknowledgement frame used to indicate a receiving state of the A-MPDU received by the receiving unit, where the acknowledgement frame includes a BA bitmap field, and each bit in the BA bitmap field is used to indicate a receiving state of one MPDU in the A-MPDU, and a sending unit configured to send the acknowledgement frame determined by the determining unit to the sending device.

With reference to the fifth aspect, in a first possible implementation manner, the acknowledgement frame further includes an A-MPDU identification field, and the A-MPDU identification field is used by the sending device to distinguish between the A-MPDU and another A-MPDU sent by the sending device.

With reference to the first possible implementation manner of the fifth aspect, in a second possible implementation manner of the fifth aspect, the A-MPDU identification field includes an SN and an FN that are included in a first MPDU in the A-MPDU.

According to a sixth aspect, an embodiment of the present disclosure provides a receiving device, including a transceiver configured to receive an A-MPDU sent by a sending device, and a processor configured to determine an acknowledgement frame used to indicate a receiving state of the A-MPDU received by the transceiver, where the acknowledgement frame includes a BA bitmap field, and each bit in the BA bitmap field is used to indicate a receiving state of one MPDU in the A-MPDU, where the transceiver is further configured to send the acknowledgement frame determined by the processor to the sending device.

With reference to the sixth aspect, in a first possible implementation manner, the acknowledgement frame further includes an A-MPDU identification field, and the A-MPDU identification field is used by the sending device to distinguish between the A-MPDU and another A-MPDU sent by the sending device.

With reference to the first possible implementation manner of the sixth aspect, in a second possible implementation manner of the sixth aspect, the A-MPDU identification field includes an SN and an FN that are included in a first MPDU in the A-MPDU.

According to a seventh aspect, an embodiment of the present disclosure provides a receiving state indication method for an MSDU fragment, including sending, by a transmit end to a receive end, an A-MPDU including an MSDU fragment, sending, by the transmit end, a request frame to the receive end, where the request frame is used to request to indicate a receiving state of the MSDU fragment included in the A-MPDU, and receiving, by the transmit end, a response frame sent by the receive end, where the response frame is used to indicate the receiving state of the MSDU fragment included in the A-MPDU.

With reference to the seventh aspect, in a first possible implementation manner, the request frame includes an SN of the MSDU fragment, and the response frame includes the SN of the MSDU fragment and an indication field used to indicate the receiving state of the MSDU fragment.

With reference to the seventh aspect, in a second possible implementation manner, when the transmit end sends A-MPDUs including MSDU fragments to multiple receive ends, the request frame is used to request the multiple receive ends to separately send a response frame to the transmit end, where the request frame includes information about an association between an identity of each receive end of the multiple receive ends and an SN of an MSDU fragment received by the receive end.

With reference to the seventh aspect, in a third possible implementation manner, when the transmit end sends all fragments of an MSDU to the receive end using at least one A-MPDU, the request frame sent by the transmit end is used to request to indicate a receiving state of each fragment in the MSDU, and the response frame received by the transmit end is used to indicate the receiving state of each fragment in the MSDU.

According to an eighth aspect, an embodiment of the present disclosure provides a receiving state indication method for an MSDU fragment, including receiving, by a receive end, an A-MPDU that includes an MSDU fragment and that is sent by a transmit end, receiving, by the receive end, a request frame sent by the transmit end, where the request frame is used to request to indicate a receiving state of the MSDU fragment included in the A-MPDU, and sending, by the receive end, a response frame to the transmit end, where the response frame is used to indicate the receiving state of the MSDU fragment included in the A-MPDU.

With reference to the eighth aspect, in a first possible implementation manner, the request frame includes an SN of the MSDU fragment, and the response frame includes the SN of the MSDU fragment and an indication field used to indicate the receiving state of the MSDU fragment.

With reference to the eighth aspect, in a second possible implementation manner, when the transmit end sends A-MPDUs including MSDU fragments to multiple receive ends, the request frame is used to request the multiple receive ends to separately send a response frame to the transmit end, where the request frame includes SNs of MSDU fragments respectively received by the multiple receive ends.

With reference to the eighth aspect, in a third possible implementation manner, when the receive end receives all fragments of an MSDU that are sent by the transmit end using at least one A-MPDU, the request frame received by the receive end is used to request to indicate a receiving state of each fragment in the MSDU, and the response frame sent by the receive end to the transmit end is used to indicate the receiving state of each fragment in the MSDU.

According to a ninth aspect, an embodiment of the present disclosure provides a sending device, including a sending unit configured to send an A-MPDU including an MSDU fragment to a receiving device, and send a request frame to the receiving device, where the request frame is used to request to indicate a receiving state of the MSDU fragment included in the A-MPDU, and a receiving unit configured to receive a response frame sent by the receiving device, where the response frame is used to indicate the receiving state of the MSDU fragment included in the A-MPDU sent by the sending unit.

With reference to the ninth aspect, in a first possible implementation manner, the request frame includes an SN of the MSDU fragment, and the response frame includes the SN of the MSDU fragment and an indication field used to indicate the receiving state of the MSDU fragment.

With reference to the ninth aspect, in a second possible implementation manner, when the sending unit sends A-MPDUs including MSDU fragments to multiple receiving devices, the request frame is used to request the multiple receiving devices to separately send a response frame to the sending device, where the request frame includes information about an association between an identity of each receiving device of the multiple receiving devices and an SN of an MSDU fragment received by the receiving device.

With reference to the ninth aspect, in a third possible implementation manner, when the sending unit sends all fragments of an MSDU to the receiving device using at least one A-MPDU, the request frame sent by the sending unit is used to request to indicate a receiving state of each fragment in the MSDU, and the response frame received by the receiving unit is used to indicate the receiving state of each fragment in the MSDU.

According to a tenth aspect, an embodiment of the present disclosure provides a receiving device, including a receiving unit configured to receive an A-MPDU that includes an MSDU fragment and that is sent by a sending device, and receive a request frame sent by the sending device, where the request frame is used to request to indicate a receiving state of the MSDU fragment included in the A-MPDU, a determining unit configured to determine a response frame, where the response frame is used to indicate the receiving state of the MSDU fragment included in the A-MPDU received by the receiving unit, and a sending unit configured to send the response frame determined by the determining unit to the sending device.

With reference to the tenth aspect, in a first possible implementation manner, the request frame includes an SN of the MSDU fragment, and the response frame includes the SN of the MSDU fragment and an indication field used to indicate the receiving state of the MSDU fragment.

With reference to the tenth aspect, in a second possible implementation manner, when the sending device sends A-MPDUs including MSDU fragments to multiple receiving devices, the request frame received by the receiving unit is used to request the multiple receiving devices to separately send a response frame to the sending device, where the request frame includes SNs of MSDU fragments respectively received by the multiple receiving devices.

With reference to the tenth aspect, in a third possible implementation manner, when the receiving unit receives all fragments of an MSDU that are sent by the sending device using at least one A-MPDU, the request frame received by the receiving unit is used to request to indicate a receiving state of each fragment in the MSDU, and the response frame sent by the sending unit to the sending device is used to indicate the receiving state of each fragment in the MSDU.

According to an eleventh aspect, an embodiment of the present disclosure provides a sending device, including a transceiver configured to send an A-MPDU including an MSDU fragment to a receiving device, send a request frame to the receiving device, where the request frame is used to request to indicate a receiving state of the MSDU fragment included in the A-MPDU, and receive a response frame sent by the receiving device, where the response frame is used to indicate the receiving state of the MSDU fragment included in the A-MPDU.

With reference to the eleventh aspect, in a first possible implementation manner, the request frame includes an SN of the MSDU fragment, and the response frame includes the SN of the MSDU fragment and an indication field used to indicate the receiving state of the MSDU fragment.

With reference to the eleventh aspect, in a second possible implementation manner, when the transceiver sends A-MPDUs including MSDU fragments to multiple receiving devices, the request frame is used to request the multiple receiving devices to separately send a response frame to the sending device, where the request frame includes information about an association between an identity of each receiving device of the multiple receiving devices and an SN of an MSDU fragment received by the receiving device.

With reference to the eleventh aspect, in a third possible implementation manner, when the transceiver sends all fragments of an MSDU to the receiving device using at least one A-MPDU, the request frame sent by the transceiver is used to request to indicate a receiving state of each fragment in the MSDU, and the response frame received by the transceiver is used to indicate the receiving state of each fragment in the MSDU.

According to a twelfth aspect, an embodiment of the present disclosure provides a receiving device, including a transceiver configured to receive an A-MPDU that includes an MSDU fragment and that is sent by a sending device, and receive a request frame sent by the sending device, where the request frame is used to request to indicate a receiving state of the MSDU fragment included in the A-MPDU, and a processor configured to determine a response frame, where the response frame is used to indicate the receiving state of the MSDU fragment included in the A-MPDU received by the transceiver, where the transceiver is further configured to send the response frame determined by the processor to the sending device.

With reference to the twelfth aspect, in a first possible implementation manner, the request frame includes an SN of the MSDU fragment, and the response frame includes the SN of the MSDU fragment and an indication field used to indicate the receiving state of the MSDU fragment.

With reference to the twelfth aspect, in a second possible implementation manner, when the sending device sends A-MPDUs including MSDU fragments to multiple receiving devices, the request frame received by the transceiver is used to request the multiple receiving devices to separately send a response frame to the sending device, where the request frame includes SNs of MSDU fragments respectively received by the multiple receiving devices.

With reference to the twelfth aspect, in a third possible implementation manner, when the receiving device receives all fragments of an MSDU that are sent by the sending device using at least one A-MPDU, the request frame received by the receiving device is used to request to indicate a receiving state of each fragment in the MSDU, and the response frame sent by the receiving device to the sending device is used to indicate the receiving state of each fragment in the MSDU.

According to a thirteenth aspect, an embodiment of the present disclosure provides a receiving state indication method for an A-MPDU, including allocating, by a transmit end, an SN to each MPDU in an A-MPDU, sending, by the transmit end, the A-MPDU to a receive end, where each MPDU in the A-MPDU carries the SN of each MPDU, and receiving, by the transmit end, an acknowledgement frame sent by the receive end, where the acknowledgement frame includes an indication field used to indicate a receiving state of each MPDU in the A-MPDU, and each bit in the indication field is used to indicate one MPDU in a sequence of SNs in the A-MPDU.

With reference to the thirteenth aspect, in a first possible implementation manner, the allocating, by a transmit end, an SN to each MPDU in an A-MPDU includes allocating, by the transmit end, the SN to each MPDU in the A-MPDU when at least one MPDU in the A-MPDU is obtained by encapsulating a fragment of an MSDU.

With reference to the thirteenth aspect, in a second possible implementation manner, the SN is carried in a MAC header of the MPDU.

With reference to the thirteenth aspect, in a third possible implementation manner, when the acknowledgement frame uses a frame format of a compressed BA frame, the indication field included in the acknowledgement frame is a BA bitmap field in the compressed BA frame.

With reference to the thirteenth aspect, in a fourth possible implementation manner, the acknowledgement frame further includes a fragment indication field, and the fragment indication field is used to indicate that at least one MPDU in the A-MPDU is obtained by encapsulating a fragment of an MSDU.

According to a fourteenth aspect, an embodiment of the present disclosure provides a receiving state indication method for an A-MPDU, including receiving, by a receive end, an A-MPDU sent by a transmit end, where each MPDU in the A-MPDU carries an SN of each MPDU, and sending, by the receive end, an acknowledgement frame to the transmit end, where the acknowledgement frame includes an indication field used to indicate a receiving state of each MPDU in the A-MPDU, and each bit in the indication field is used to indicate one MPDU in a sequence of MPDU SNs in the A-MPDU.

With reference to the fourteenth aspect, in a first possible implementation manner, the SN is carried in a MAC header of the MPDU.

With reference to the fourteenth aspect, in a second possible implementation manner, when the acknowledgement frame uses a frame format of a compressed BA frame, the indication field included in the acknowledgement frame is a BA bitmap field in the compressed BA frame.

With reference to the fourteenth aspect, in a third possible implementation manner, before the sending, by the receive end, an acknowledgement frame to the transmit end, the method further includes determining, by the receive end, that at least one MPDU in the A-MPDU is obtained by encapsulating a fragment of an MSDU when each MPDU in the A-MPDU carries the SN of each MPDU, where the acknowledgement frame further includes a fragment indication field, and the fragment indication field is used to indicate that at least one MPDU in the A-MPDU is obtained by encapsulating a fragment of an MSDU.

According to a fifteenth aspect, an embodiment of the present disclosure provides a sending device, including an allocation unit configured to allocate an SN to each MPDU in an A-MPDU, a sending unit configured to send the A-MPDU to a receiving device, where each MPDU in the A-MPDU carries the SN allocated by the allocation unit, and a receiving unit configured to receive an acknowledgement frame sent by the receiving device, where the acknowledgement frame includes an indication field used to indicate a receiving state of each MPDU in the A-MPDU sent by the sending unit, and each bit in the indication field is used to indicate one MPDU in a sequence of SNs in the A-MPDU.

With reference to the fifteenth aspect, in a first possible implementation manner, the allocation unit is further configured to allocate the SN to each MPDU in the A-MPDU when at least one MPDU in the A-MPDU is obtained by encapsulating a fragment of an MSDU.

With reference to the fifteenth aspect, in a second possible implementation manner, the SN is carried in a MAC header of the MPDU.

With reference to the fifteenth aspect, in a third possible implementation manner, when the acknowledgement frame uses a frame format of a compressed BA frame, the indication field included in the acknowledgement frame is a BA bitmap field in the compressed BA frame.

With reference to the fifteenth aspect, in a fourth possible implementation manner, the acknowledgement frame further includes a fragment indication field, and the fragment indication field is used to indicate that at least one MPDU in the A-MPDU is obtained by encapsulating a fragment of an MSDU.

According to a sixteenth aspect, an embodiment of the present disclosure provides a receiving device, including a receiving unit configured to receive an A-MPDU sent by a sending device, where each MPDU in the A-MPDU carries an SN of each MPDU, a determining unit configured to determine an acknowledgement frame, where the acknowledgement frame includes an indication field used to indicate a receiving state of each MPDU in the A-MPDU received by the receiving unit, and each bit in the indication field is used to indicate one MPDU in a sequence of MPDU SNs in the A-MPDU, and a sending unit configured to send the acknowledgement frame determined by the determining unit to the sending device.

With reference to the sixteenth aspect, in a first possible implementation manner, the SN is carried in a MAC header of the MPDU.

With reference to the sixteenth aspect, in a second possible implementation manner, when the acknowledgement frame uses a frame format of a compressed BA frame, the indication field included in the acknowledgement frame is a BA bitmap field in the compressed BA frame.

With reference to the sixteenth aspect, in a third possible implementation manner, the acknowledgement frame determined by the determining unit further includes a fragment indication field, and the fragment indication field is used to indicate that at least one MPDU in the A-MPDU is obtained by encapsulating a fragment of an MSDU.

According to a seventeenth aspect, an embodiment of the present disclosure provides a sending device, including a processor configured to allocate an SN to each MPDU in an A-MPDU, and a transceiver configured to send the A-MPDU to a receiving device, where each MPDU in the A-MPDU carries the SN allocated by the processor, and receive an acknowledgement frame sent by the receiving device, where the acknowledgement frame includes an indication field used to indicate a receiving state of each MPDU in the A-MPDU, and each bit in the indication field is used to indicate one MPDU in a sequence of SNs in the A-MPDU.

With reference to the seventeenth aspect, in a first possible implementation manner, the processor is further configured to allocate the SN to each MPDU in the A-MPDU when at least one MPDU in the A-MPDU is obtained by encapsulating a fragment of an MSDU.

With reference to the seventeenth aspect, in a second possible implementation manner, the SN is carried in a MAC header of the MPDU.

With reference to the seventeenth aspect, in a third possible implementation manner, when the acknowledgement frame uses a frame format of a compressed BA frame, the indication field included in the acknowledgement frame is a BA bitmap field in the compressed BA frame.

With reference to the seventeenth aspect, in a fourth possible implementation manner, the acknowledgement frame further includes a fragment indication field, and the fragment indication field is used to indicate that at least one MPDU in the A-MPDU is obtained by encapsulating a fragment of an MSDU.

According to an eighteenth aspect, an embodiment of the present disclosure provides a receiving device, including a transceiver configured to receive an A-MPDU sent by a sending device, where each MPDU in the A-MPDU carries an SN of each MPDU, and a processor configured to determine an acknowledgement frame, where the acknowledgement frame includes an indication field used to indicate a receiving state of each MPDU in the A-MPDU received by the transceiver, and each bit in the indication field is used to indicate one MPDU in a sequence of MPDU SNs in the A-MPDU, where the transceiver is further configured to send the acknowledgement frame determined by the processor to the sending device.

With reference to the eighteenth aspect, in a first possible implementation manner, the SN is carried in a MAC header of the MPDU.

With reference to the eighteenth aspect, in a second possible implementation manner, when the acknowledgement frame uses a frame format of a compressed BA frame, the indication field included in the acknowledgement frame is a BA bitmap field in the compressed BA frame.

With reference to the eighteenth aspect, in a third possible implementation manner, the acknowledgement frame determined by the processor further includes a fragment indication field, and the fragment indication field is used to indicate that at least one MPDU in the A-MPDU is obtained by encapsulating a fragment of an MSDU.

A receiving state of an A-MPDU including an MSDU fragment can be indicated using the four technical solutions provided in the embodiments of the present disclosure.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Embodiments of the present disclosure provide a receiving state indication method for an A-MPDU, a receiving state indication method for an MSDU fragment, a sending device, and a receiving device in order to indicate a receiving state of an A-MPDU including an MSDU fragment. The methods and the devices are based on a same inventive concept. Because a problem-resolving principle of the methods is similar to that of the devices, mutual reference may be made to implementation of the devices and implementation of the methods, and no repeated description is provided.

Figures 1, 2, 3:
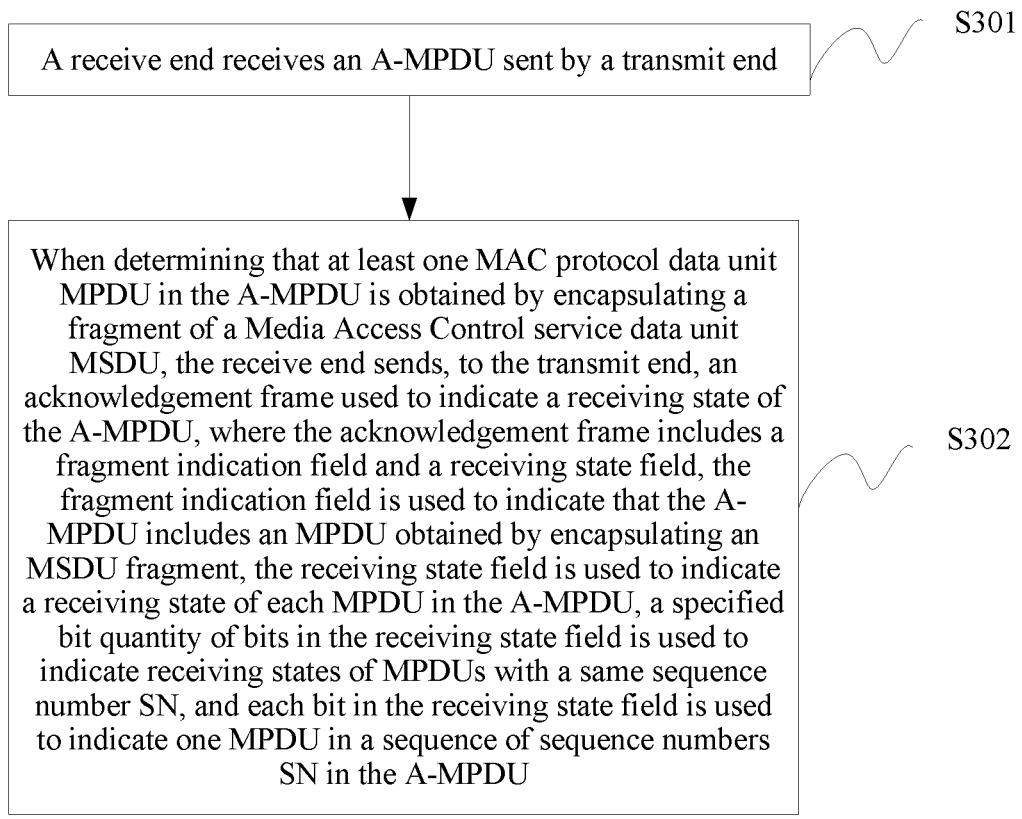
FIG. 1 is a schematic diagram of data transmission using an OFDMA technology.
FIG. 2 is a schematic structural diagram of a sequence control field in an MPDU according to an embodiment of the present disclosure.
FIG. 3 is a schematic flowchart of a receiving state indication method for an A-MPDU according to an embodiment of the present disclosure.

The present disclosure relates to a technology for transmitting an A-MPDU including an MSDU fragment. The technology for transmitting an A-MPDU including an MSDU fragment means that a transmit end transmits multiple MPDUs to a receive end by aggregating the MPDUs. Aggregated MPDUs are distinguished using MPDU delimiters. Each MPDU may be obtained by encapsulating an MSDU or an MSDU fragment. The MSDU fragment is a segment of an MSDU. All fragments except a last fragment need to have an equal length and include even-numbered bytes. Optionally, whether an MSDU is equally fragmented is not limited in the present disclosure. An MPDU header of an MPDU includes a sequence control field. As shown in FIG. 2, the sequence control field includes an SN and an FN. The SN is used to identify an MSDU encapsulated in the MPDU or an MSDU to which an MSDU fragment belongs. Each MSDU corresponds to one SN. The FN is used to identify an MSDU fragment encapsulated in the MPDU. MSDU fragments that belong to a same MSDU are respectively corresponding to different FNs. In a process of transmitting an A-MPDU including an MSDU fragment, if transmission of a fragment fails, the fragment is allowed to be retransmitted, and there is no need to retransmit an MSDU to which the fragment belongs, thereby improving robustness and a throughput rate of a network system.

In the embodiments of the present disclosure, an A-MSDU or an A-MSDU fragment may also be encapsulated in an MPDU. The A-MSDU fragment is a segment of an A-MSDU. For ease of description, an MSDU fragment in the following embodiments may be understood as an A-MSDU fragment.

A receiving state of an A-MPDU including an MSDU fragment can be indicated using the technical solutions provided in the embodiments of the present disclosure. Details are as follows.

Embodiment 1

As shown in FIG. 3, this embodiment of the present disclosure provides a receiving state indication method for an A-MPDU, including the following steps.

Step S301: A receive end receives an A-MPDU sent by a transmit end.

Step S302: When at least one MPDU in the A-MPDU is obtained by encapsulating a fragment of an MSDU, the receive end sends, to the transmit end, an acknowledgement frame used to indicate a receiving state of the A-MPDU, where the acknowledgement frame includes a fragment indication field and a receiving state field. The fragment indication field is used to indicate that the A-MPDU includes an MPDU obtained by encapsulating an MSDU fragment. The fragment indication field is used to distinguish a type of the acknowledgement frame. The receiving state field is used to indicate a receiving state of each MPDU in the A-MPDU. A specified bit quantity of bits in the receiving state field is used to indicate receiving states of MPDUs with a same SN. Each bit in the receiving state field is used to indicate one MPDU in a sequence of SNs in the A-MPDU.

The acknowledgement frame in this embodiment may be a BA frame. To facilitate distinction between the acknowledgement frame and an existing BA frame, in the following content, the acknowledgement frame in this embodiment is described as a first BA frame, and the existing BA frame is described as a second BA frame.

In this embodiment, when all MPDUs in the A-MPDU are obtained by encapsulating MSDUs, the receive end uses a second BA frame (an existing BA frame) to indicate a receiving state of the A-MPDU. A specific method includes that when all MPDUs in the A-MPDU are obtained by encapsulating MSDUs, the receive end sends, to the transmit end, a second BA frame used to indicate a receiving state of the A-MPDU.

The second BA frame includes a fragment indication field and a receiving state field. The fragment indication field is used to indicate that the A-MPDU indicated by the second BA frame does not include an MPDU obtained by encapsulating an MSDU fragment. Each bit in the receiving state field is used to indicate a receiving state of one MPDU in a sequence of SNs in the A-MPDU.

A major difference between the first BA frame and the second BA frame lies in that the first BA frame is used to indicate a receiving state of an A-MPDU including an MSDU fragment, and the second BA frame is used to indicate a receiving state of an A-MPDU that does not include an MSDU fragment, and the first BA frame is a new BA frame provided in this embodiment, and the second BA frame is an existing BA frame. In this embodiment, fragment indication fields are used to distinguish between the first BA frame and the second BA frame.

In step S302 in this embodiment, the receive end may determine, according to an FN field carried in an MPDU in the A-MPDU, whether the A-MPDU includes an MSDU fragment. The FN field is carried in a sequence control field of an MPDU header of the MPDU.

When all FN fields in MPDUs in the A-MPDU include 0, it indicates that the A-MPDU does not include an MSDU fragment. When an FN field in at least one MPDU in the A-MPDU does not include 0, it indicates that the A-MPDU includes an MSDU fragment. Therefore, when the receive end determines that an FN field carried in at least one MPDU in the A-MPDU sent by the transmit end includes not only 0, the receive end determines that the at least one MPDU in the A-MPDU is obtained by encapsulating a fragment of an MSDU. That is, the receive end determines that the A-MPDU sent by the transmit end includes an MSDU fragment. In this case, the receive end selects a first BA frame to indicate the receiving state of the A-MPDU.

In this embodiment, the transmit end uses fragment indication fields to distinguish between the first BA frame and the second BA frame. The first BA frame and the second BA frame may use a frame format of an M-BA frame or a frame format of a compressed BA frame. The compressed BA frame may be transmitted in a multi-user manner, for example, multiple user multiple-input multiple-output (MU-MIMO) or OFDMA, or may be transmitted in a single user manner. The fragment indication field may use the following form according to different frame formats used by the first BA frame and the second BA frame.

1. The frame format of the M-BA frame or the frame format of the compressed BA frame is used.

Both a BA information field in the M-BA frame and a BA information field in the compressed BA frame include a starting sequence control field. The starting sequence control field includes four reserved bits. The fragment indication field may include one or more bits of the four reserved bits to indicate that the BA frame is a first BA frame or a second BA frame.

2. The frame format of the M-BA frame or the frame format of the compressed BA frame is used.

Both the M-BA frame and the compressed BA frame include a TID field with four bits. The fragment indication field may include one or more bits in the TID field to indicate that the BA frame is a first BA frame or a second BA frame.

The fragment indication field includes one bit in the TID field. Because only three bits in the TID field are used in a currently used enhanced distributed channel access (EDCA) mechanism, the fragment indication field may use the remaining one bit in the TID field to indicate that the BA frame is a first BA frame or a second BA frame.

The fragment indication field includes multiple bits in the TID field. The fragment indication field includes multiple bits in the TID field to indicate a particular TID value. The particular TID value is used to indicate that the BA frame is a first BA frame or a second BA frame. For example, when the fragment indication field includes the four bits in the TID field, a TID value that may be indicated by the four bits ranges from 0 to 15, and a particular TID value indicated by the fragment indication field may be an integer in a range from 8 to 15.

Figure 4:
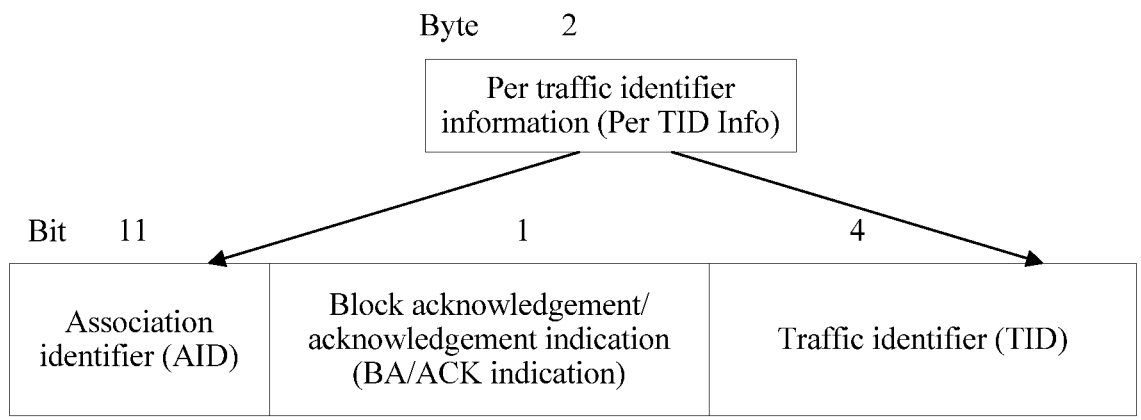
FIG. 4 is a schematic structural diagram of a per TID information field in an M-BA frame according to an embodiment of the present disclosure.

For the M-BA frame, as shown in FIG. 4, the TID field is located in a per TID information (Per TID Info) field in a BA information field in the M-BA frame. The field may also be referred to as a per association identifier information (Per AID Info) field. Each Per TID Info field includes an association identifier (AID) field, a BA/acknowledgement policy (BA/ACK policy) indication field, and a TID field. For the compressed BA frame, the TID field is located in a BA control field in the compressed BA frame.

3. The frame format of the compressed BA frame is used.

Figure 5:
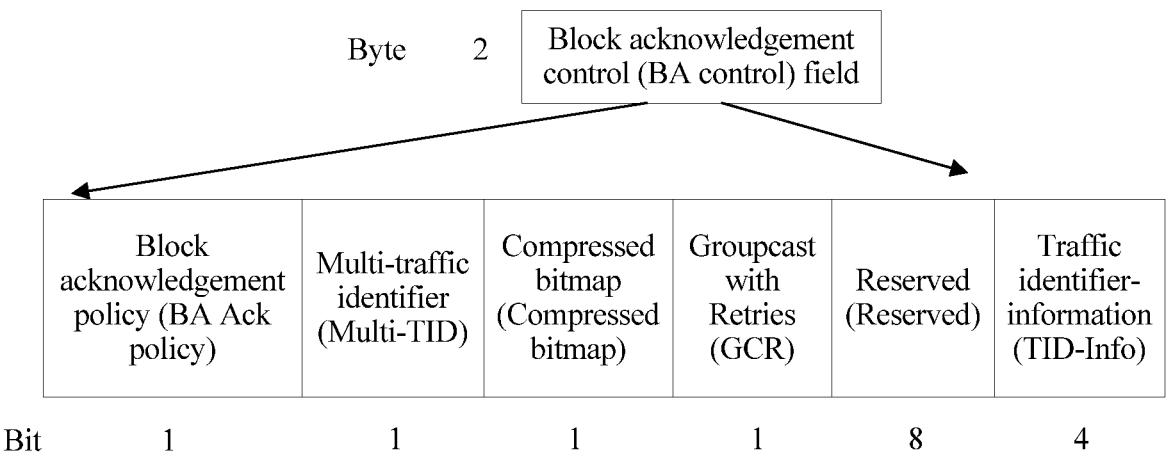
FIG. 5 is a schematic structural diagram of a BA control field in a compressed BA frame according to an embodiment of the present disclosure.

FIG. 5 shows a structure of a BA control field in a compressed BA frame. The fragment indication field includes one or more bits of eight reserved bits in the BA control field in the compressed BA frame.

4. The frame format of the compressed BA frame is used.

The fragment indication field includes a Multi-TID bit, a compressed bitmap bit, and a GCR bit in a BA control field in the compressed BA frame. For example, as shown in the following Table 1, the fragment indication field includes a corresponding Multi-TID bit, compressed bitmap bit, and GCR bit in Table 1 when a BA frame variant is "reserved".

TABLE 1

| Multi-TID bit | Compressed bitmap bit | GCR bit | BA frame variant |
| --- | --- | --- | --- |
| 0 | 0 | 0 | Basic BA |
| 0 | 1 | 0 | Compressed |
| 1 | 0 | 0 | Extended compressed BA |
| 1 | 1 | 0 | Multi-TID BA |
| 0 | 0 | 1 | Reserved |
| 0 | 1 | 1 | GCR BA |
| 1 | 0 | 1 | Reserved |
| 1 | 1 | 1 | Reserved |

In this embodiment, the first BA frame includes a fragment indication field and a receiving state field. The receiving state field is used to indicate a receiving state of each MPDU in the A-MPDU. A specified bit quantity of bits in the receiving state field is used to indicate receiving states of MPDUs with a same SN. Each bit in the receiving state field is used to indicate one MPDU in a sequence of SNs in the A-MPDU. Optionally, for the bits in the receiving state field that are used to indicate the receiving states of the MPDUs with the same SN, the specified bit quantity of the bits is greater than or equal to a maximum value of an allowed quantity of MSDU fragments.

Figure 6:
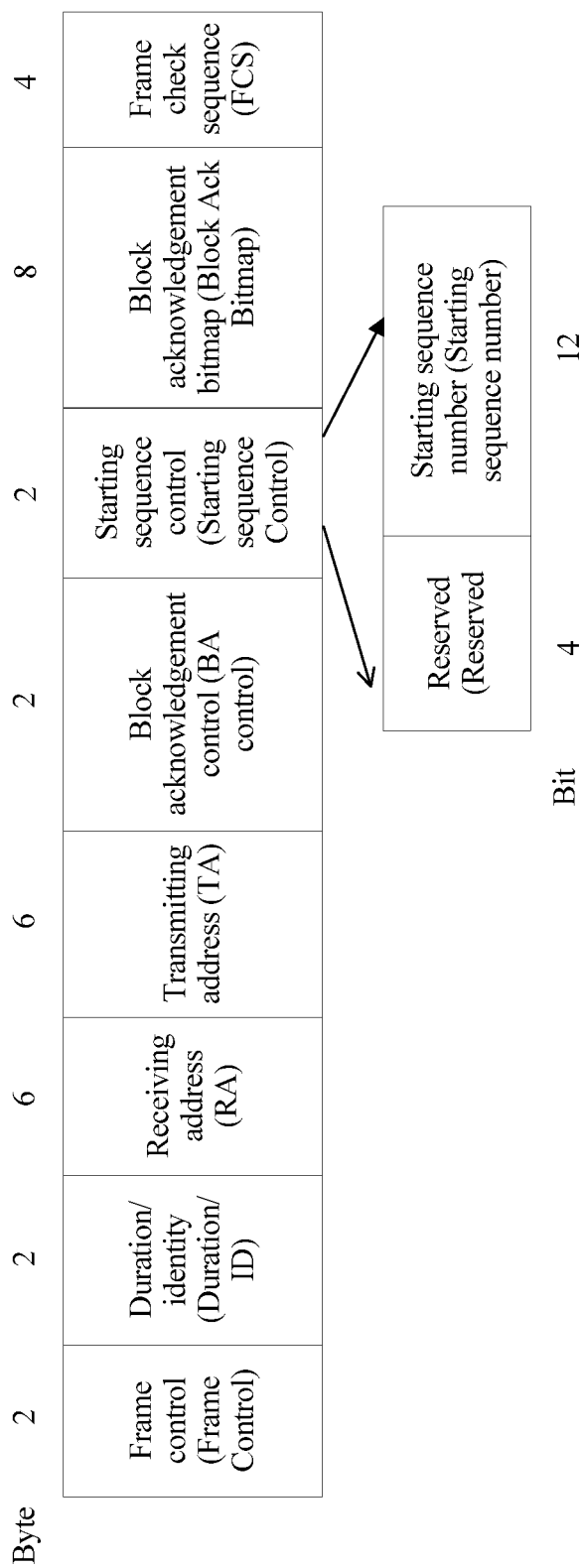
FIG. 6 is a schematic structural diagram of a compressed BA frame according to an embodiment of the present disclosure.

For example, the first BA frame uses a structure of a compressed BA frame shown in FIG. 6. The receiving state field is a BA bitmap field in the compressed BA frame in FIG. 6. The BA bitmap field includes eight bytes (that is, 64 bits). It is assumed that a maximum value of an allowed quantity of MSDU fragments is 4, and the BA bitmap field uses every four bits to indicate receiving states of MPDUs with a same SN. If an MPDU is obtained by encapsulating an MSDU, four bits corresponding to an SN of the MPDU are used to jointly indicate a receiving state of the MPDU, or one bit of the four bits may be selected to indicate the receiving state of the MPDU. Optionally, a first bit of the four bits is selected to indicate the receiving state of the MPDU, and three other bits of the four bits are padded with 0. If an MPDU is obtained by encapsulating an MSDU fragment, four bits corresponding to an SN of the MPDU respectively indicate receiving states of four MPDUs. The four MPDUs are obtained by respectively encapsulating four MSDU fragments with the same SN. If a total quantity of fragments of the MSDU is n, where n is less than 4, n bits of four bits are selected to indicate receiving states of MPDUs obtained by respectively encapsulating the n MSDU fragments. Optionally, first n bits of the four bits are selected to indicate the receiving states of the MPDUs obtained by respectively encapsulating the n MSDU fragments, and remaining bits are padded with 0.

Figure 7:
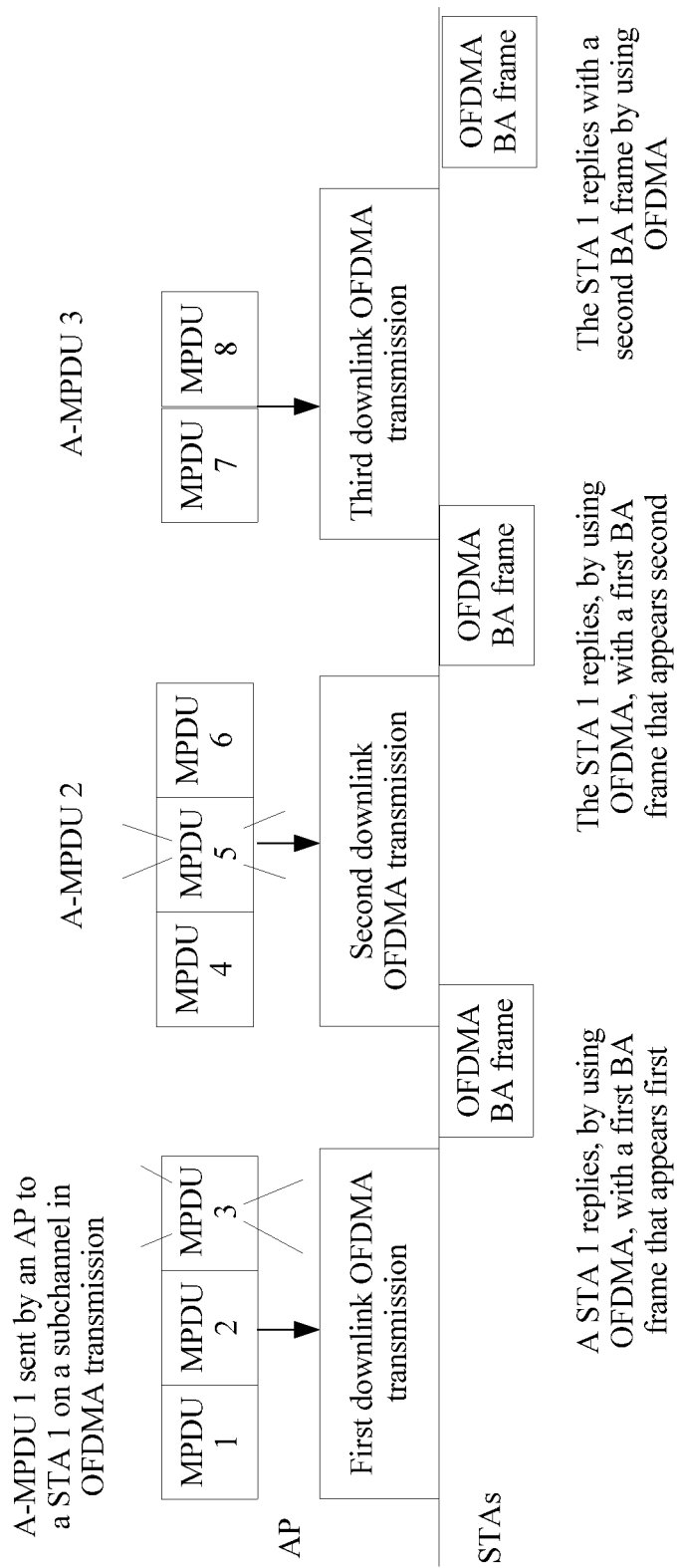
FIG. 7 is a schematic diagram of data transmission using an OFDMA technology according to an embodiment of the present disclosure.

Downlink OFDMA transmission is used as an example. Assuming that a bit is set to 1, it indicates that a receiving state is success, and assuming that a bit is set to 0, it indicates that a receiving state is failure. As shown in FIG. 7, an access point (AP) sends downlink data in an OFDMA transmission manner. The AP transmits three A-MPDUs to a STA 1. An A-MPDU 1 includes three MPDUs, where an MPDU 1 and an MPDU 2 are obtained by respectively encapsulating an MSDU 1 and an MSDU 2, and an MPDU 3 is obtained by encapsulating a fragment 1 of an MSDU 3, and the STA 1 successfully receives the MPDU 1 and the MPDU 2, and fails to receive the MPDU 3. An A-MPDU 2 includes three MPDUs, where an MPDU 4 is obtained by encapsulating the retransmitted fragment 1 of the MSDU 3, an MPDU 5 is obtained by encapsulating a fragment 2 of the MSDU 3, and an MPDU 6 is obtained by encapsulating an MSDU 4, and the STA 1 successfully receives the MPDU 4 and the MPDU 6, and fails to receive the MPDU 5. An A-MPDU 3 includes two MPDUs, where an MPDU 7 and an MPDU 8 are obtained by respectively encapsulating an MSDU 5 and an MSDU 6, and the STA 1 successfully receives the MPDU 7 and the MPDU 8. Because the fragment 1 of the MSDU 3 and the fragment 2 of the MSDU 3 belong to the same MSDU 3, the fragment 1 and the fragment 2 have a same SN.

Figure 8:
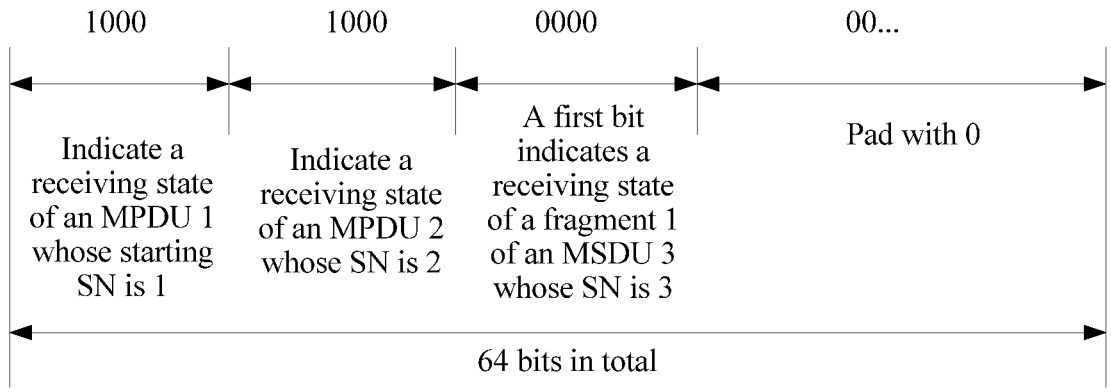
FIG. 8 is a schematic diagram of a receiving indication field of a first BA frame according to an embodiment of the present disclosure.
Figure 9:
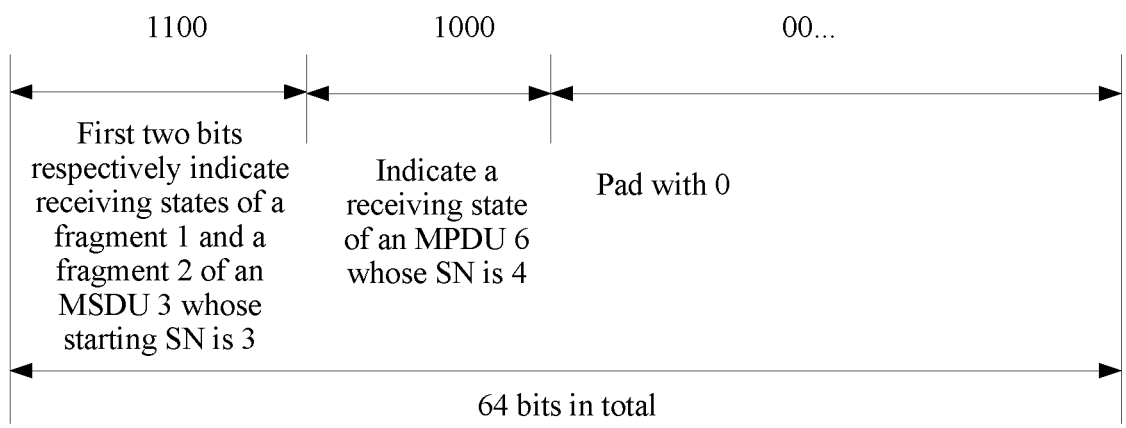
FIG. 9 is a schematic diagram of a receiving indication field of a first BA frame according to an embodiment of the present disclosure.
Figure 10:
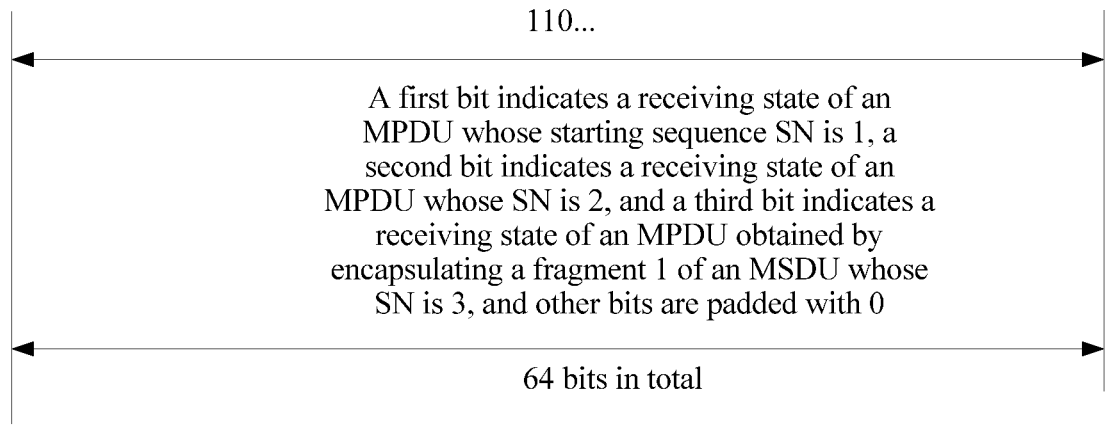
FIG. 10 is a schematic diagram of a receiving indication field of a second BA frame according to an embodiment of the present disclosure.

The STA 1 sends first BA frames to the AP to indicate a receiving state of the A-MPDU 1 and a receiving state of the A-MPDU 2. One first BA frame is used to indicate the receiving state of the A-MPDU 1. An SN in a starting sequence control field in the one first BA frame is 1 (an SN is usually indicated using 12 bits). A receiving state field of the one first BA frame is shown in FIG. 8. The other first BA frame is used to indicate the receiving state of the A-MPDU 2. An SN in a starting sequence control field in the other first BA frame is 3. A receiving state field of the other first BA frame is shown in FIG. 9. The STA sends a second BA frame to the AP to indicate a receiving state of the A-MPDU 3. An SN in a starting sequence control field in the second BA frame is 5. A receiving state field of the second BA frame is shown in FIG. 10.

As shown in FIG. 7, after receiving the A-MPDU, the receive end immediately sends the first BA frame to the transmit end. It should be noted that in a case of a possible delay of the first BA frame, after receiving the A-MPDU, the receive end may delay a period of time before sending the first BA frame to the transmit end.

In Embodiment 1, after a receive end receives an A-MPDU sent by a transmit end, and when at least one MPDU in the A-MPDU is obtained by encapsulating a fragment of an MSDU, the receive end sends, to the transmit end, a first BA frame used to indicate a receiving state of the A-MPDU, where the first BA frame includes a fragment indication field and a receiving state field, the fragment indication field is used to indicate that the A-MPDU includes an MPDU that is obtained by encapsulating an MSDU fragment, the receiving state field is used to indicate a receiving state of each MPDU in the A-MPDU, a specified bit quantity of bits in the receiving state field is used to indicate receiving states of MPDUs with a same SN, and each bit in the receiving state field is used to indicate one MPDU in a sequence of SNs in the A-MPDU. A receiving state of an A-MPDU including an MSDU fragment can be indicated using the method provided in Embodiment 1.

Embodiment 2

Figure 11:
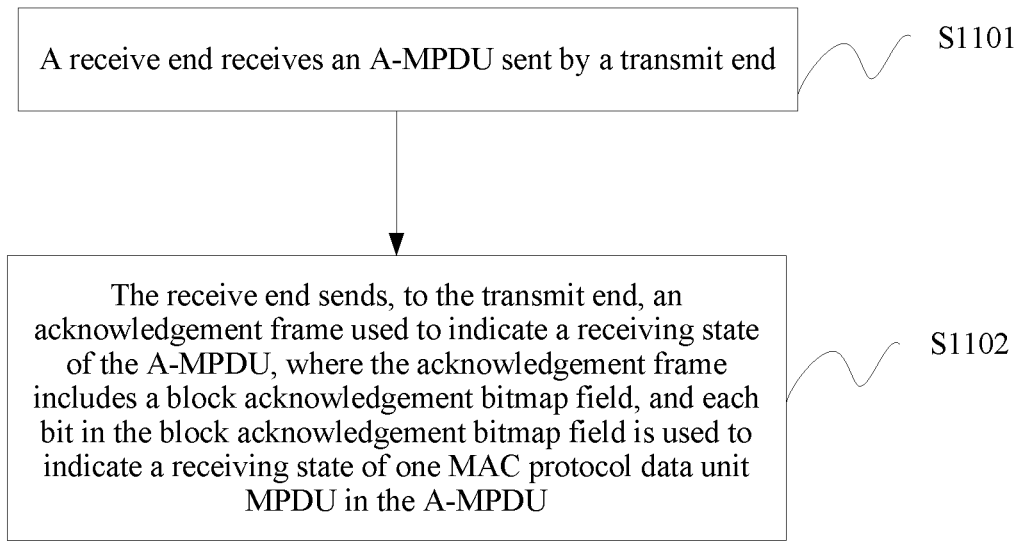
FIG. 11 is a schematic flowchart of a receiving state indication method for an A-MPDU according to an embodiment of the present disclosure.

As shown in FIG. 11, this embodiment of the present disclosure provides a receiving state indication method for an A-MPDU, including the following steps.

Step S1101: A receive end receives an A-MPDU sent by a transmit end.

Step S1102: The receive end sends, to the transmit end, an acknowledgement frame used to indicate a receiving state of the A-MPDU, where the acknowledgement frame includes a BA bitmap field, and each bit in the BA bitmap field is used to indicate a receiving state of one MPDU in the A-MPDU.

In this embodiment, the acknowledgement frame may be a BA frame. The acknowledgement frame is described as a BA frame in the following content. The BA frame may use a frame format of a compressed BA frame shown in FIG. 6, or may use a frame format of an M-BA frame. A frame format of a compressed BA frame is used as an example. A BA bitmap field in the compressed BA frame includes 64 bits (eight bytes). If each bit in the BA bitmap field is used to indicate a receiving state of one MPDU in an A-MPDU, the BA bitmap field can indicate receiving states of a maximum of 64 MPDUs in the A-MPDU.

Figure 12:
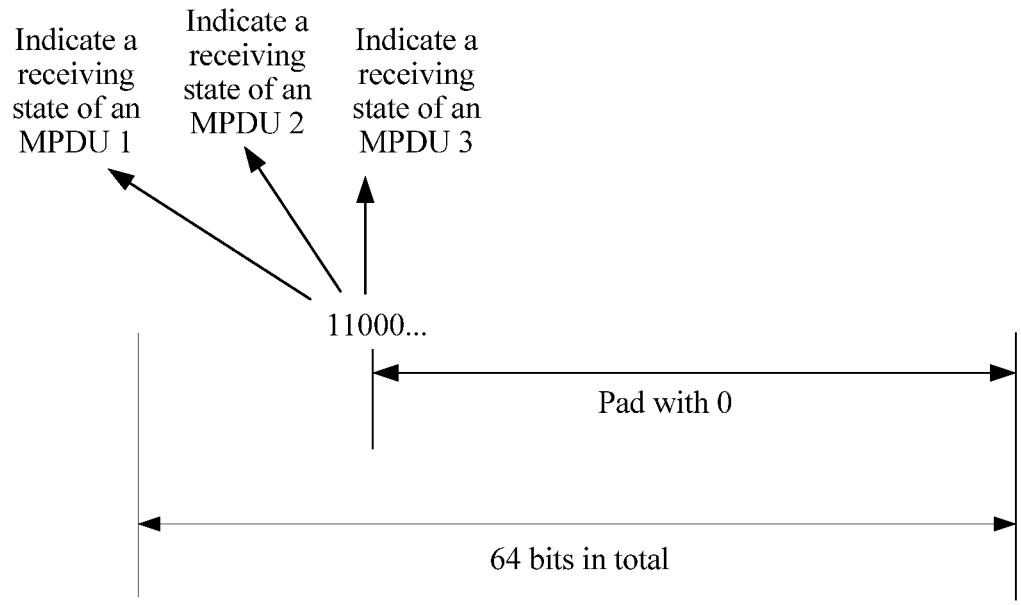
FIG. 12 is a schematic diagram of a BA bitmap field in a BA frame according to an embodiment of the present disclosure.

For example, downlink OFDMA transmission is used as an example. Assuming that a bit is set to 1, it indicates that a receiving state is success, and assuming that a bit is set to 0, it indicates that a receiving state is failure. As shown in FIG. 7, an AP sends downlink data in an OFDMA transmission manner. The AP transmits three A-MPDUs to a STA 1. An A-MPDU 1 includes three MPDUs, where an MPDU 1 and an MPDU 2 are obtained by respectively encapsulating an MSDU 1 and an MSDU 2, and an MPDU 3 is obtained by encapsulating a fragment 1 of an MSDU 3, and the STA 1 successfully receives the MPDU 1 and the MPDU 2, and fails to receive the MPDU 3. An A-MPDU 2 includes three MPDUs, where an MPDU 4 is obtained by encapsulating the retransmitted fragment 1 of the MSDU 3, an MPDU 5 is obtained by encapsulating a fragment 2 of the MSDU 3, and an MPDU 6 is obtained by encapsulating an MSDU 4, and the STA 1 successfully receives the MPDU 4 and the MPDU 6, and fails to receive the MPDU 5. An A-MPDU 3 includes two MPDUs, where an MPDU 7 is obtained by encapsulating the retransmitted fragment 2 of the MSDU 3, and an MPDU 8 is obtained by encapsulating the MSDU 4, and the STA 1 successfully receives the MPDU 7 and the MPDU 8. Because the fragment 1 of the MSDU 3 and the fragment 2 of the MSDU 3 belong to the same MSDU 3, the fragment 1 and the fragment 2 have a same SN. The STA 1 needs to send three BA frames to the AP. The three acknowledgement frames are used to respectively indicate receiving states of the three A-MPDUs. A BA bitmap field in a BA frame used to indicate a receiving state of the A-MPDU 1 is shown in FIG. 12. Likewise, a BA bitmap field in a BA frame used to indicate a receiving state of the second A-MPDU includes 101 . . . (64 bits in total), and a BA bitmap field in a BA frame used to indicate a receiving state of the third A-MPDU includes 11 . . . (64 bits in total).

Because the receive end may delay sending the BA frame, after the transmit end sends the A-MPDU, the BA frame indicating the A-MPDU does not necessarily reach the transmit end immediately. If all first MPDUs in multiple A-MPDUs are obtained by encapsulating different fragments of a same MSDU, the first MPDUs in the multiple A-MPDUs have a same SN. For example, first MPDUs in the A-MPDU 2 and the A-MPDU 3 in the foregoing example have a same SN, and in this case, the transmit end needs to distinguish a BA frame used to indicate a receiving state of an A-MPDU.

In this embodiment, in consideration of a possible delay of the BA frame, the BA frame sent by the receive end to the transmit end further includes an A-MPDU identification field. The A-MPDU identification field is used by the transmit end to distinguish an A-MPDU acknowledged by the acknowledgement frame.

Optionally, the A-MPDU identification field in the BA frame includes an SN and an FN that are included in a first MPDU in the A-MPDU indicated by the BA frame. The SN is located in last 12 bits in a starting sequence field in the BA frame (the other approaches). The FN is located in first four reserved bits in the starting sequence field in the BA frame (the method provided in this embodiment, which is different from the other approaches). The transmit end may distinguish between different A-MPDUs according to SNs and FNs that are carried in A-MPDU identification fields.

It should be noted that, in this embodiment, content of the A-MPDU identification field in the BA frame is not limited to the content described above. The A-MPDU identification field may also include other content provided that the transmit end can distinguish, according to the content of the A-MPDU identification field in the BA frame, an A-MPDU whose receiving state is indicated by the BA frame.

Technical solutions in Embodiment 2 may be combined with technical solutions in Embodiment 1 for use.

In Embodiment 2, after a receive end receives an A-MPDU sent by a transmit end, the receive end sends, to the transmit end, an acknowledgement frame used to indicate a receiving state of the A-MPDU, where the acknowledgement frame includes a BA bitmap field, and each bit in the BA bitmap field is used to indicate a receiving state of one MPDU in the A-MPDU. A receiving state of an A-MPDU including an MSDU fragment can be indicated using the method provided in Embodiment 2. The acknowledgement frame may be a first BA frame in Embodiment 1, and is used to indicate a receiving state of an A-MPDU including an MSDU fragment.

Embodiment 3

Figure 13:
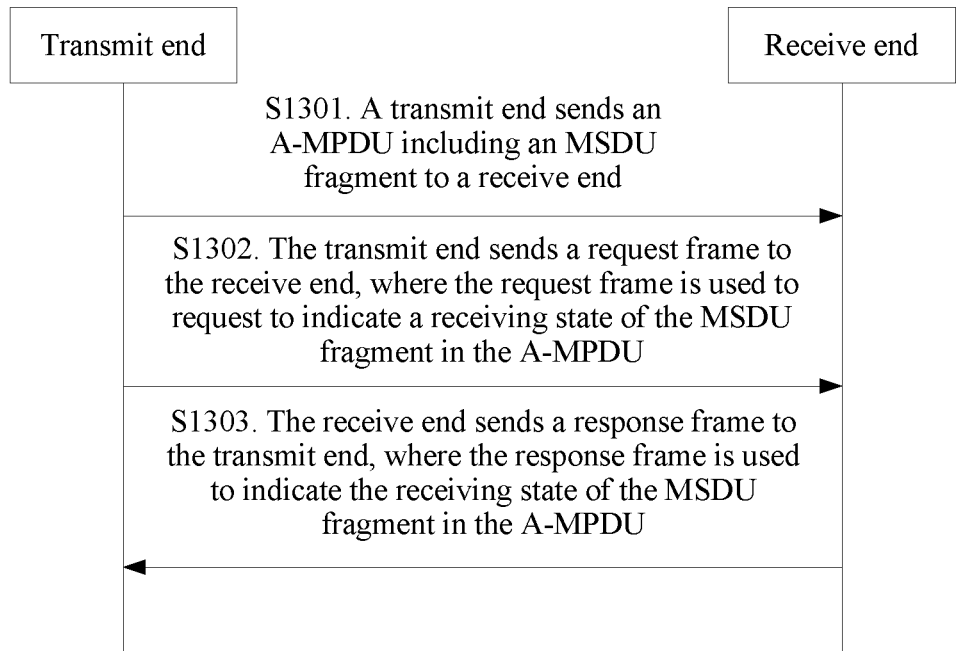
FIG. 13 is a schematic flowchart of a receiving state indication method for an MSDU fragment according to an embodiment of the present disclosure.

As shown in FIG. 13, this embodiment of the present disclosure provides a receiving state indication method for an MSDU fragment. A process of interaction between a transmit end and a receive end is as follows.

Step S1301: The transmit end sends an A-MPDU including an MSDU fragment to the receive end.

Step S1302: The transmit end sends a request frame to the receive end, where the request frame is used to request to indicate a receiving state of the MSDU fragment in the A-MPDU.

Step S1303: The receive end sends a response frame to the transmit end, where the response frame is used to indicate the receiving state of the MSDU fragment in the A-MPDU.

In this embodiment, after the transmit end sends the A-MPDU including an MSDU fragment to the receive end, the receive end indicates, to the transmit end using an existing BA frame, a receiving state of an MPDU that is obtained by encapsulating an MSDU and that is in the A-MPDU. The BA frame does not indicate a receiving state of an MPDU that is obtained by encapsulating an MSDU fragment and that is in the A-MPDU. When the transmit end sends the request frame to the receive end to request to indicate the receiving state of the MSDU fragment, the receive end indicates the receiving state of the MSDU fragment using the response frame.

It should be noted that an occasion for sending a request frame is not limited in this embodiment. The transmit end may send, after sending an A-MPDU including an MSDU fragment, a request frame to the receive end. In this case, the request frame is used to request to indicate a receiving state of the MSDU fragment in the A-MPDU. The transmit end may send, after sending multiple A-MPDUs including MSDU fragments, a request frame to the receive end. In this case, the request frame is used to request to indicate receiving states of the MSDU fragments in the multiple A-MPDUs. The transmit end sends a request frame after sending all fragments of an MSDU to the receive end. A specific method includes that when the transmit end sends all fragments of an MSDU to the receive end using at least one A-MPDU, the transmit end sends a request frame to the receive end, where the request frame is used to request to indicate a receiving state of each fragment in the MSDU, and the receive end sends a response frame to the transmit end, where the response frame is used to indicate the receiving state of each fragment in the MSDU.

It should be noted that a manner of sending the request frame and the response frame is not limited in this embodiment. Downlink data transmission is used as an example. An AP may send a request frame using downlink OFDMA, and a STA may send a response frame using uplink OFDMA. Uplink data transmission is used as an example. A STA may send a request frame using uplink OFDMA contention-based random access, and the uplink OFDMA contention-based random access transmission needs to be triggered by an AP by sending a trigger frame. The STA may send a request frame using uplink OFDMA scheduling, and the uplink OFDMA scheduling transmission also needs to be triggered by the AP by sending a trigger frame. In this embodiment, the request frame and the response frame may also be sent in a MU-MIMO manner.

Figure 14:
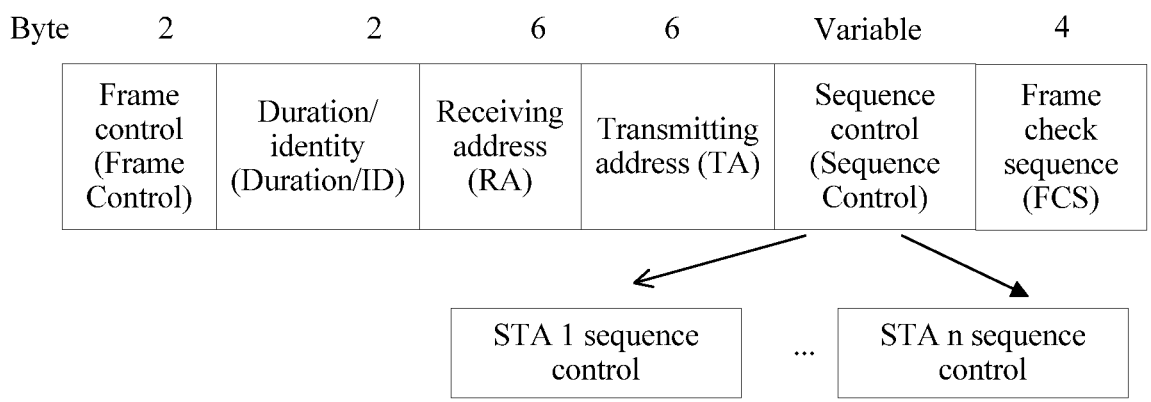
FIG. 14 is a schematic diagram of a frame format of a request frame according to an embodiment of the present disclosure.

In this embodiment, the request frame includes an SN of the MSDU fragment. A frame format of a request frame shown in FIG. 14 is used as an example. The SN of the MSDU fragment is carried in an SN field in a sequence control field. The receive end can learn, according to the SN carried in the request frame, a receiving state that is of a fragment of an MSDU corresponding to the SN and that the transmit end wants to request to indicate. A request frame sent by an AP may be for multiple STAs. A structure of the request frame is shown in FIG. 14. A receiving address (RA) is a broadcast address, a sequence control field includes sequence control subfields of the multiple STAs, and each subfield includes a STA identity and an SN. The STA identity may be an AID allocated by the AP to the STA. Optionally, the request frame sent by the AP includes resource allocation indication information and/or an FN, where the resource allocation indication information indicates a subchannel or a frequency resource block on which the STA replies with a response frame, and may further include a parameter, such as a modulation and coding scheme (MCS) used by the STA to transmit a BA.

Figure 15:
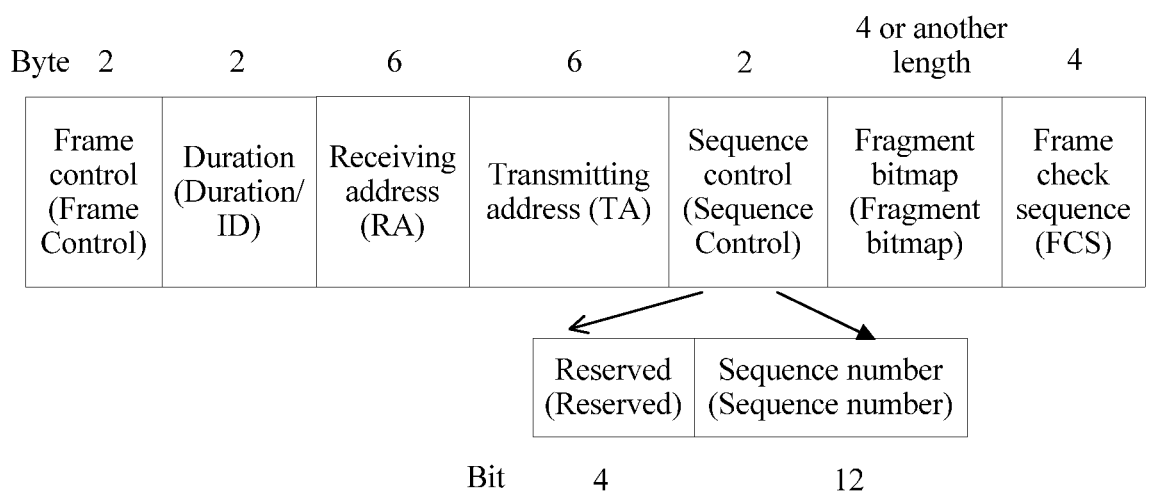
FIG. 15 is a schematic diagram of a frame format of a response frame according to an embodiment of the present disclosure.

In this embodiment, the response frame includes the SN of the MSDU fragment and an indication field used to indicate the receiving state of the MSDU fragment. A frame format of a response frame shown in FIG. 15 is used as an example. The SN of the MSDU fragment is carried in an SN field in a sequence control field, the indication field is a fragment bitmap field, and a length of the indication field may be set according to a requirement. When the length of the indication field is eight bits, the indication field can indicate receiving states of a maximum of eight MSDU fragments. Each bit is used to indicate a receiving state of one MSDU fragment, and so on.

Figure 16:
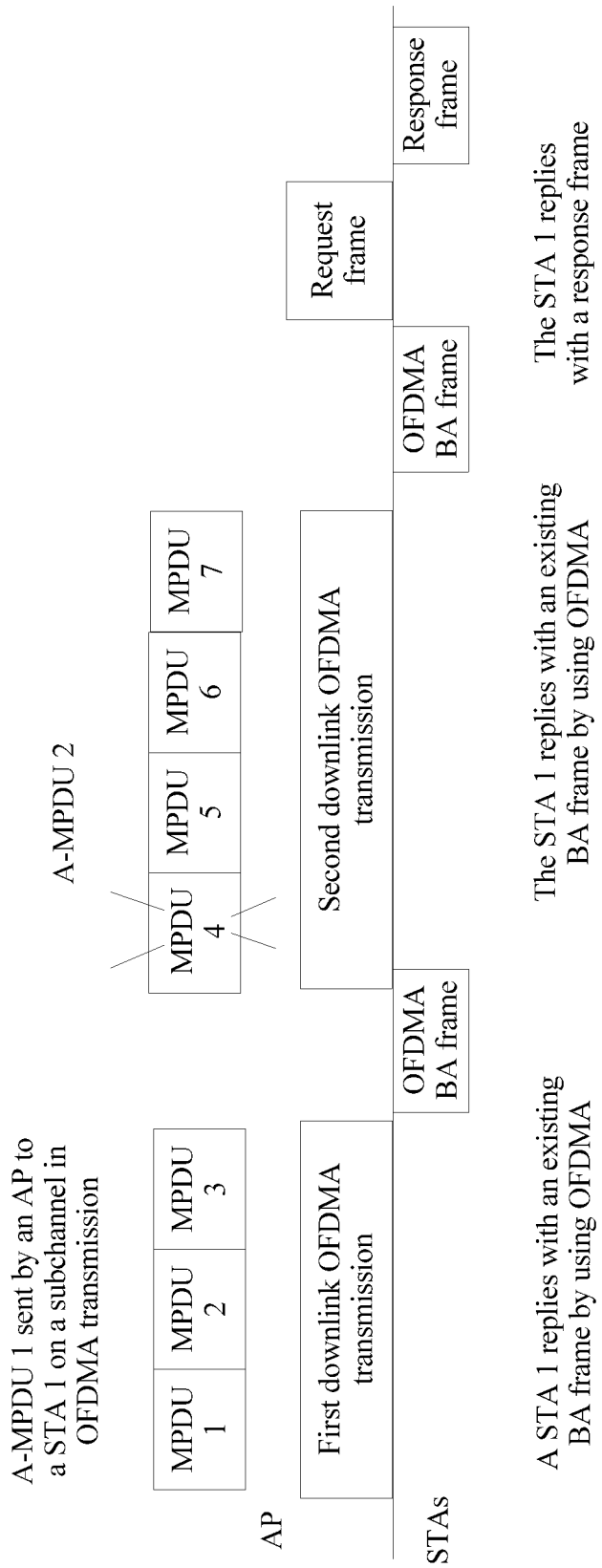
FIG. 16 is a schematic diagram of data transmission using an OFDMA technology according to an embodiment of the present disclosure.

For example, assuming that a bit is set to 1, it indicates that a receiving state is success, and assuming that a bit is set to 0, it indicates that a receiving state is failure. Downlink OFDMA data transmission shown in FIG. 16 is used as an example. An AP sends data in an OFDMA transmission manner. The AP transmits two A-MPDUs to a STA 1. An A-MPDU 1 includes three MPDUs, where an MPDU 1 and an MPDU 2 are obtained by respectively encapsulating an MSDU 1 and an MSDU 2, and an MPDU 3 is obtained by encapsulating a fragment 1 of an MSDU 3, and the STA 1 successfully receives the MPDU 1, the MPDU 2, and the MPDU 3. An A-MPDU 2 includes four MPDUs, where an MPDU 4 is obtained by encapsulating a fragment 2 of the MSDU 3, an MPDU 5 is obtained by encapsulating a fragment 3 of the MSDU 3, and an MPDU 6 and an MPDU 7 are obtained by respectively encapsulating an MSDU 4 and an MSDU 5, and the STA 1 fails to receive the MPDU 4, and successfully receives the MPDU 5, the MPDU 6, and the MPDU 7. The STA 1 needs to send two BA frames to the AP. A first BA frame indicates receiving states of only the MPDU 1 and the MPDU 2 in the A-MPDU 1. A second BA frame indicates receiving states of only the MPDU 6 and the MPDU 7 in the A-MPDU 2. A request frame sent by the AP to the STA 1 carries an SN of the MSDU 3, and is used to request to indicate receiving states of the fragment 1, the fragment 2, and the fragment 3 of the MSDU 3. A response frame sent by the STA 1 to the AP carries the SN of the MSDU 3, and an indication field is 101. The first bit indicates that the fragment 1 of the MSDU 3 is successfully received, the second bit indicates that receiving of the fragment 2 of the MSDU 3 fails, and the third bit indicates that the fragment 3 of the MSDU 3 is successfully received.

In this embodiment, when the transmit end sends A-MPDUs including MSDU fragments to multiple receive ends, the request frame sent by the transmit end may be used to request the multiple receive ends to separately reply to the transmit end with a response frame. The request frame includes information about an association between an identity of each receiving device of multiple receiving devices and an SN of an MSDU fragment received by the receiving device. For example, as shown in FIG. 14, a sequence control field in a request frame includes information about an association between an identity of each STA of multiple receive ends from a STA 1 to a STA n and an SN of an MSDU fragment corresponding to the STA. The multiple STAs separately use a frame format shown in FIG. 15 to reply to an AP with a response frame.

In Embodiment 3, a transmit end sends an A-MPDU including an MSDU fragment to a receive end. The transmit end sends a request frame to the receive end, where the request frame is used to request to indicate a receiving state of the MSDU fragment in the A-MPDU, and the receive end sends a response frame to the transmit end, where the response frame is used to indicate the receiving state of the MSDU fragment in the A-MPDU. A receiving state of an MSDU fragment in an A-MPDU can be indicated using the technical solutions provided in Embodiment 3.

Embodiment 4

Figure 17:
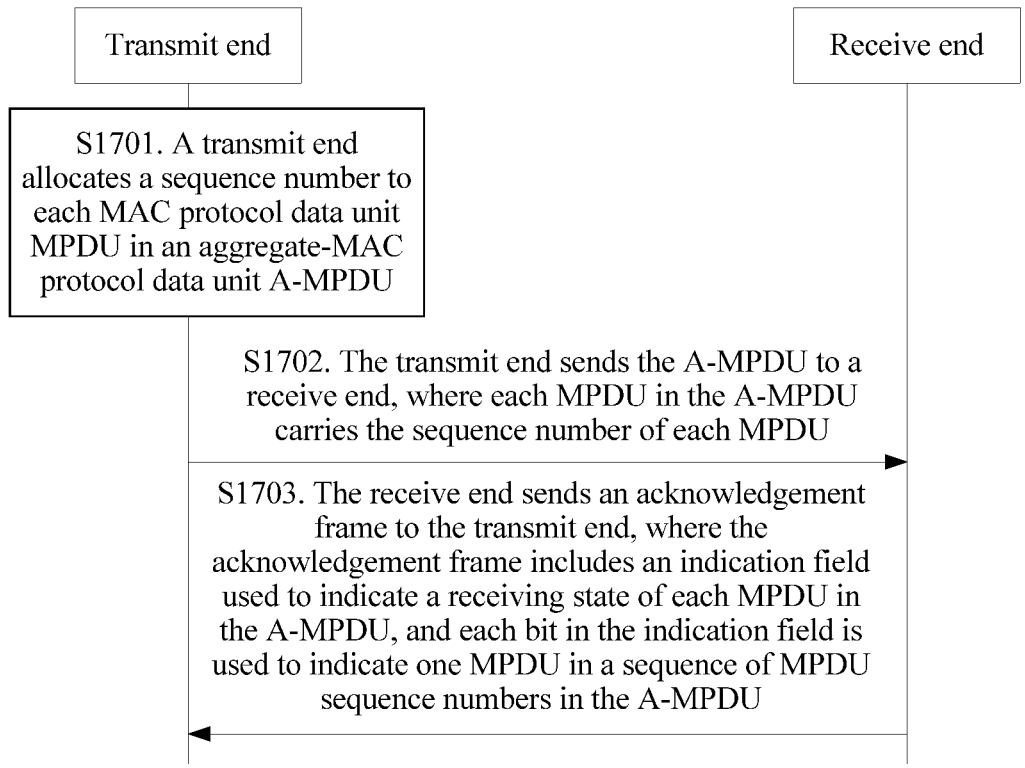
FIG. 17 is a schematic flowchart of a receiving state indication method for an A-MPDU according to an embodiment of the present disclosure.

As shown in FIG. 17, this embodiment of the present disclosure provides a receiving state indication method for an A-MPDU. A process of interaction between a transmit end and a receive end is as follows.

Step S1701: The transmit end allocates an SN to each MPDU in an A-MPDU.

Step S1702: The transmit end sends the A-MPDU to the receive end, where each MPDU in the A-MPDU carries the SN of each MPDU.

Step S1703: The receive end sends a BA/ACK frame to the transmit end, where the acknowledgement frame includes an indication field used to indicate a receiving state of each MPDU in the A-MPDU, and each bit in the indication field is used to indicate one MPDU in a sequence of MPDU SNs in the A-MPDU.

In this embodiment, optionally, when at least one MPDU in the A-MPDU is obtained by encapsulating a fragment of an MSDU, the transmit end allocates the SN to each MPDU in the A-MPDU. In this way, the transmit end is prevented from allocating SNs to MPDUs in all A-MPDUs, and workload of the transmit end is reduced.

The acknowledgement frame in this embodiment may be a BA frame. To facilitate distinction between the acknowledgement frame and an existing BA frame, in the following content, the acknowledgement frame in this embodiment is described as a first BA frame, and the existing BA frame is described as a second BA frame. The SN allocated by the transmit end to each MPDU in the A-MPDU is carried in a MAC header of the MPDU. The SN is temporarily allocated by the transmit end to the MPDU. A preferred implementation manner is that the receive end indicates, to the transmit end, a receiving state of an A-MPDU including an MSDU fragment using only an MPDU SN. The MPDU may carry the SN in the following several manners.

Figure 18:
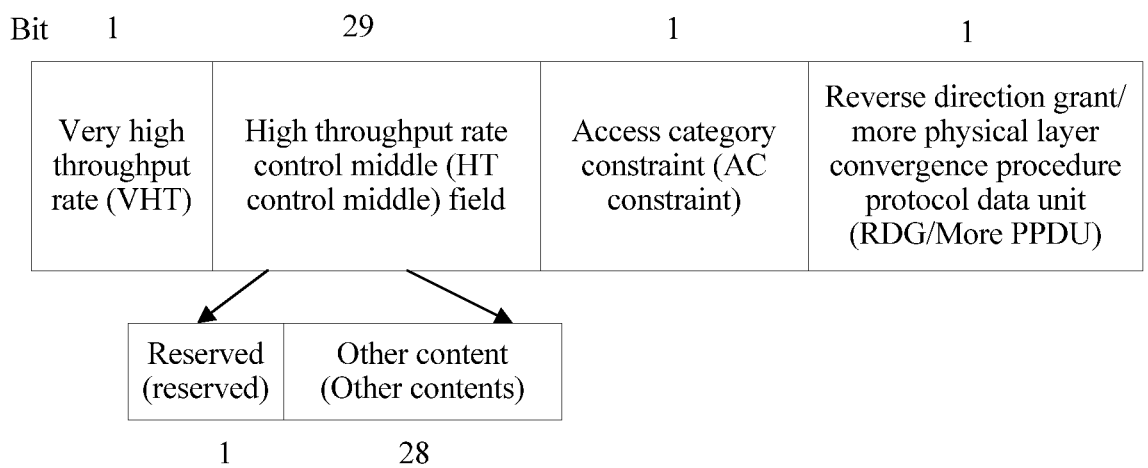
FIG. 18 is a schematic structural diagram of a high throughput (HT) control field according to an embodiment of the present disclosure.

Manner 1: The SN of the MPDU may be carried in a HT rate control field of the MAC header. FIG. 18 shows a schematic structural diagram of an HT control field. A reserved field in the HT control field is used to indicate that the field is an HT control field of this generation WLAN system. Several bits of 28 bits in other content fields may be used to indicate a temporary SN of the MPDU. Alternatively, an access category constraint (AC constraint) indication bit and a reverse direction grant/more physical layer convergence procedure protocol data unit (RDG/More PPDU) indication bit in the HT control field may be used to indicate the SN of the MPDU. Because one A-MPDU includes a maximum of 64 MPDUs, five bits are preferably used to indicate a SN of an MPDU.

Figures 19, 20:
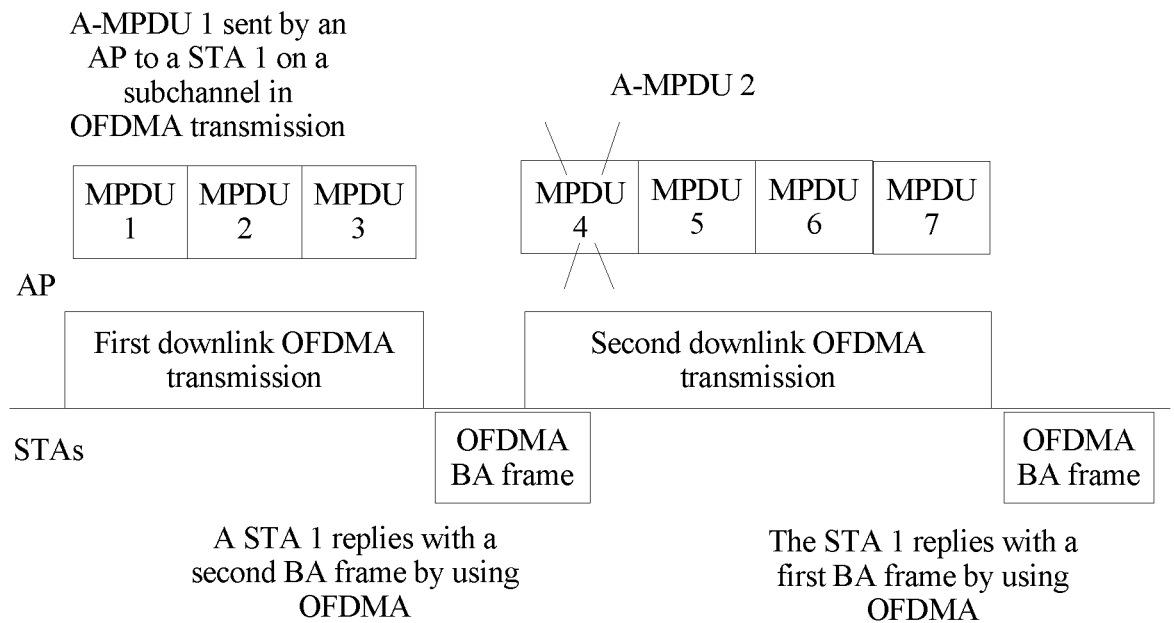
FIG. 19 is a schematic structural diagram of a quality of service (QoS) control field according to an embodiment of the present disclosure.
FIG. 20 is a schematic diagram of data transmission using an OFDMA technology according to an embodiment of the present disclosure.

Manner 2: The SN of the MPDU may be carried in a QoS control field of the MAC header. FIG. 19 shows a schematic structural diagram of a QoS control field. Several bits of eight bits in a transmit opportunity (TXOP) limit field/queue size field/reserved control field may be used to indicate the SN of the MPDU. Optionally, any bit other than the eight bits in the QoS control field is used to indicate that the QoS control field carries the SN of the MPDU.

In this embodiment, the first BA frame (a BA frame provided in this embodiment) is used to indicate a receiving state of an A-MPDU including an MSDU fragment, and the second BA frame (an existing BA frame) is used to indicate a receiving state of an A-MPDU that does not include an MSDU fragment. In this embodiment, when the receive end determines that FN fields of all MPDUs in the received A-MPDU include only 0, it indicates that the A-MPDU does not include an MSDU fragment. In this case, the receive end feeds back a receiving state of each MPDU in the A-MPDU to the transmit end using the second BA frame. This is specified in the other approaches, and details are not described herein.

To distinguish between the first BA frame and the second BA frame, both the first BA frame and the second BA frame further include a fragment indication field. A fragment indication field in the first BA frame is used to indicate that at least one MPDU in an A-MPDU indicated by the first BA frame is obtained by encapsulating a fragment of an MSDU. A fragment indication field in the second BA frame is used to indicate that all MPDUs in an A-MPDU indicated by the second BA frame are obtained by encapsulating MSDUs. The receive end may determine, using a fragment indication field in a BA frame, whether an A-MPDU indicated by the BA frame includes an MSDU fragment. A specific form used by the fragment indication fields in the first BA frame and the second BA frame is as follows.

1. A frame format of an M-BA frame or a frame format of a compressed BA frame is used.

Both a BA information field in the M-BA frame and a BA information field in the compressed BA frame include a starting sequence control field. The starting sequence control field includes four reserved bits. The fragment indication field may include one or more bits of the four reserved bits to indicate whether an A-MPDU indicated by the BA frame includes an MSDU fragment.

2. A frame format of an M-BA frame or a frame format of a compressed BA frame is used.

Both the M-BA frame and the compressed BA frame include a TID field with four bits. The fragment indication field may include one or more bits in the TID field, to indicate whether an A-MPDU indicated by the BA frame includes an MSDU fragment.

The fragment indication field includes one bit in the TID field. Because only three bits in the TID field are used in a currently used EDCA mechanism, the fragment indication field may use the remaining one bit in the TID field to indicate whether an A-MPDU indicated by the BA frame includes an MSDU fragment.

The fragment indication field includes multiple bits in the TID field. The fragment indication field includes multiple bits in the TID field to indicate a particular TID value. The particular TID value is used to indicate whether an A-MPDU indicated by the BA frame includes an MSDU fragment. For example, when the fragment indication field includes four bits in the TID field, a TID value that may be indicated by the four bits ranges from 0 to 15, and a particular TID value indicated by the fragment indication field may be an integer in a range from 8 to 15.

For the M-BA frame, as shown in FIG. 4, the TID field is located in a Per TID info field in a BA information field in the M-BA frame. Each Per TID Info field includes an AID field, a BA/ACK policy indication field, and a TID field. For the compressed BA frame, the TID field is located in a BA control field in the compressed BA frame.

3. A frame format of a compressed BA frame is used.

FIG. 5 shows a structure of a BA control field in a compressed BA frame. The fragment indication field includes one or more bits of eight reserved bits in the BA control field in the compressed BA frame.

4. A frame format of a compressed BA frame is used.

The fragment indication field includes a Multi-TID bit, a compressed bitmap bit, and a GCR bit in a BA control field in the compressed BA frame. For example, as shown in the following Table 2, the fragment indication field includes a corresponding Multi-TID bit, compressed bitmap bit, and GCR bit in Table 2 when a BA frame variant is "reserved". In this case, the BA frame is used to indicate that an A-MPDU includes an MSDU fragment.

TABLE 2

| Multi-TID bit | Compressed bitmap bit | GCR bit | BA frame variant |
|---|---|---|---|
| 0 | 0 | 0 | Basic BA |
| 0 | 1 | 0 | Compressed BA |
| 1 | 0 | 0 | Extended compressed BA |
| 1 | 1 | 0 | Multi-TID BA |
| 0 | 0 | 1 | Reserved |
| 0 | 1 | 1 | GCR BA |
| 1 | 0 | 1 | Reserved |
| 1 | 1 | 1 | Reserved |

In this embodiment, the first BA frame may use the frame format of the compressed BA frame. The indication field included in the BA frame is a BA bitmap field in the compressed BA frame. Each bit in the BA bitmap field is used to indicate one MPDU in a sequence of MPDU SNs in the A-MPDU.

For example, assuming that a bit is set to 1, it indicates that a receiving state is success, and assuming that a bit is set to 0, it indicates that a receiving state is failure. Downlink OFDMA data transmission shown in FIG. 20 is used as an example. An AP sends data in an OFDMA transmission manner. The AP transmits two A-MPDUs to a STA 1. An A-MPDU 1 includes three MPDUs, where an MPDU 1, an MPDU 2, and an MPDU 3 are obtained by respectively encapsulating an MSDU 1, an MSDU 2, and an MSDU 3, and the STA 1 successfully receives the MPDU 1, the MPDU 2, and the MPDU 3. An A-MPDU 2 includes four MPDUs, where an MPDU 4 is obtained by encapsulating a fragment 1 of an MSDU 4, an MPDU 5 is obtained by encapsulating a fragment 2 of the MSDU 4, and an MPDU 6 and an MPDU 7 are obtained by respectively encapsulating an MSDU 5 and an MSDU 6, and the STA 1 fails to receive the MPDU 4, and successfully receives the MPDU 5, the MPDU 6, and the MPDU 7. Because the A-MPDU 2 includes an MSDU fragment, the AP allocates SNs to all MPDUs in the A-MPDU 2. It is assumed that SNs respectively corresponding to the MPDU 4 to the MPDU 7 are 1 to 4.

The STA 1 sends two BA frames to the AP. A first sent BA frame is a second BA frame (an existing BA frame), and is used to indicate a receiving state of each MPDU in a sequence of SNs in the A-MPDU 1. A starting SN is 1. It is assumed that a length of an indication field for receiving states is 64 bits, and an SN in a starting field in the first BA frame is 1, and the indication field is 111 . . . (64 bits in total). First three bits are used to sequentially indicate receiving states of the MPDU 1 to the MPDU 3, and other bits are padded with 0. A second sent BA frame is a first BA frame (a BA frame provided in this embodiment), and is used to indicate a receiving state of each MPDU in a sequence of MPDU SNs in the A-MPDU 2. It is assumed that a length of an indication field for receiving states is 64 bits, and an SN in a starting field in the second BA frame is 4, and the indication field is 0111 . . . (64 bits in total). First four bits are used to sequentially indicate receiving states of the MPDU 4 to the MPDU 7, and other bits are padded with 0.

In Embodiment 4, when at least one MPDU in an A-MPDU is obtained by encapsulating a fragment of an MSDU, a transmit end allocates an SN to each MPDU in the A-MPDU. The transmit end sends the A-MPDU to a receive end, where each MPDU in the A-MPDU carries the SN of each MPDU, and the receive end sends a BA frame to the transmit end, where the BA frame includes an indication field used to indicate a receiving state of each MPDU in the A-MPDU, and each bit in the indication field is used to indicate one MPDU in a sequence of MPDU SNs in the A-MPDU. A receiving state of an A-MPDU including an MSDU fragment can be indicated using the technical solutions provided in Embodiment 4.

Embodiment 5

Figure 21:
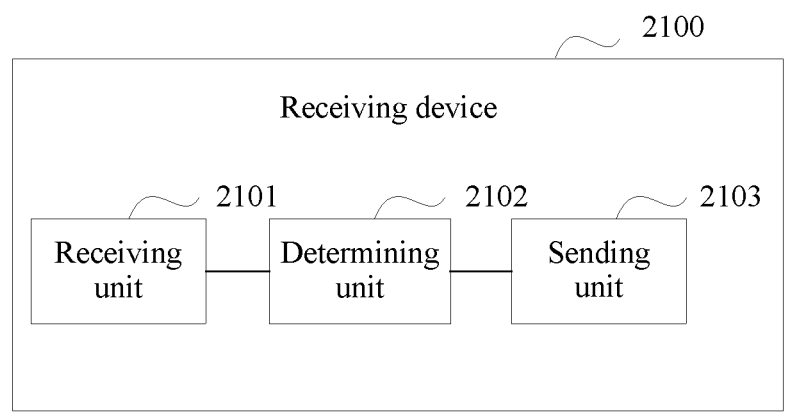
FIG. 21 is a schematic structural diagram of a receiving device according to an embodiment of the present disclosure.

Based on Embodiment 1, the present disclosure further provides a receiving device. The receiving device may use the method provided in the embodiment corresponding to FIG. 3. Referring to FIG. 21, a receiving device 2100 includes a receiving unit 2101, a determining unit 2102, and a sending unit 2103.

The receiving unit 2101 is configured to receive an A-MPDU sent by a sending device.

The determining unit 2102 is configured to determine an acknowledgement frame used to indicate a receiving state of the A-MPDU when at least one MPDU in the A-MPDU received by the receiving unit 2101 is obtained by encapsulating a fragment of an MSDU.

The sending unit 2103 is configured to send the acknowledgement frame determined by the determining unit 2102 to the sending device.

The acknowledgement frame includes a fragment indication field and a receiving state field. The fragment indication field is used to indicate that the A-MPDU includes an MPDU obtained by encapsulating an MSDU fragment. The receiving state field is used to indicate a receiving state of each MPDU in the A-MPDU. A specified bit quantity of bits in the receiving state field is used to indicate receiving states of MPDUs with a same SN. Each bit in the receiving state field is used to indicate one MPDU in a sequence of SNs in the A-MPDU.

Optionally, when at least one MPDU in the A-MPDU received by the receiving unit 2101 is obtained by encapsulating a fragment of an MSDU, the determining unit 2102 is further configured to determine that at least one MPDU in the A-MPDU is obtained by encapsulating a fragment of an MSDU when an FN field included in at least one MPDU in the A-MPDU includes not only 0.

Optionally, when the acknowledgement frame uses a frame format of an M-BA frame, the fragment indication field uses the form that the fragment indication field includes one or more bits of four reserved bits in a starting sequence control field in a BA information field in the M-BA frame, or the fragment indication field includes one or more bits in a TID field in the M-BA frame.

Optionally, when the acknowledgement frame uses a frame format of a compressed BA frame, the fragment indication field uses the form that the fragment indication field includes one or more bits of four reserved bits in a starting sequence control field in a BA information field in the compressed BA frame, the fragment indication field includes one or more bits in a TID field in a BA control field in the compressed BA frame, the fragment indication field includes one or more bits of eight reserved bits in a BA control field in the compressed BA frame, or the fragment indication field includes a Multi-TID bit, a compressed bitmap bit, and a GCR bit in a BA control field in the compressed BA frame.

Optionally, for the bits in the receiving state field that are used to indicate the receiving states of the MPDUs with the same SN, the specified bit quantity of the bits is greater than or equal to a maximum value of an allowed quantity of MSDU fragments.

It should be noted that unit division in this embodiment of the present disclosure is an example, is merely logical function division, and there may be another division in actual implementation. In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such understanding, the technical solutions of this application essentially, or the part contributing to the other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

Figure 22:
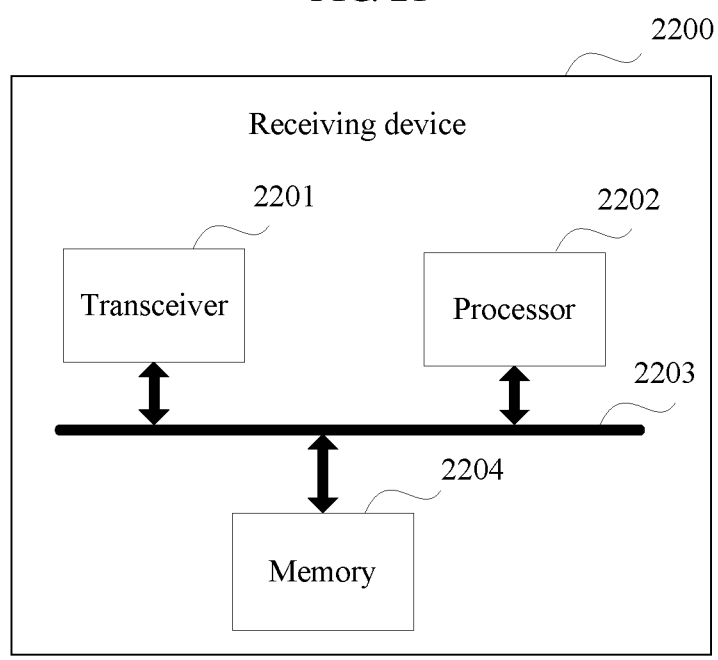
FIG. 22 is a schematic structural diagram of a receiving device according to an embodiment of the present disclosure.

Based on Embodiment 1, the present disclosure further provides a receiving device 2200. The receiving device 2200 may use the method provided in the embodiment corresponding to FIG. 3, and may be a device the same as the receiving device 2100 shown in FIG. 21. Referring to FIG. 22, the receiving device 2200 includes a transceiver 2201, a processor 2202, a bus 2203, and a memory 2204.

The transceiver 2201, the processor 2202, and the memory 2204 are interconnected using the bus 2203. The bus 2203 may be a peripheral component interconnect (PCI) bus, an extended industry standard architecture (EISA) bus, or the like. The bus 2203 may be classified into an address bus, a data bus, a control bus, and the like. For ease of illustration, only one bold line is used in FIG. 22 to represent the bus 2203, which, however, does not mean that there is only one bus or only one type of bus.

The transceiver 2201 is configured to receive an A-MPDU sent by a sending device.

The processor 2202 is configured to determine an acknowledgement frame used to indicate a receiving state of the A-MPDU when at least one MPDU in the A-MPDU received by the transceiver 2201 is obtained by encapsulating a fragment of an MSDU.

The transceiver 2201 is further configured to send the acknowledgement frame determined by the processor 2202 to the sending device.

The acknowledgement frame includes a fragment indication field and a receiving state field. The fragment indication field is used to indicate that the A-MPDU includes an MPDU obtained by encapsulating an MSDU fragment. The receiving state field is used to indicate a receiving state of each MPDU in the A-MPDU. A specified bit quantity of bits in the receiving state field is used to indicate receiving states of MPDUs with a same SN. Each bit in the receiving state field is used to indicate one MPDU in a sequence of SNs in the A-MPDU.

Optionally, that the processor 2202 determines that at least one MPDU in the A-MPDU is obtained by encapsulating a fragment of an MSDU includes that when an FN field included in at least one MPDU in the A-MPDU includes not only 0, the processor 2202 determines that at least one MPDU in the A-MPDU is obtained by encapsulating a fragment of an MSDU.

Optionally, when the acknowledgement frame uses a frame format of an M-BA frame, the fragment indication field uses the form that the fragment indication field includes one or more bits of four reserved bits in a starting sequence control field in a BA information field in the M-BA frame, or the fragment indication field includes one or more bits in a TID field in the M-BA frame.

Optionally, when the acknowledgement frame uses a frame format of a compressed BA frame, the fragment indication field uses the form that the fragment indication field includes one or more bits of four reserved bits in a starting sequence control field in a BA information field in the compressed BA frame, the fragment indication field includes one or more bits in a TID field in a BA control field in the compressed BA frame, the fragment indication field includes one or more bits of eight reserved bits in a BA control field in the compressed BA frame, or the fragment indication field includes a Multi-TID bit, a compressed bitmap bit, and a GCR bit in a BA control field in the compressed BA frame.

Optionally, for the bits in the receiving state field that are used to indicate the receiving states of the MPDUs with the same SN, the specified bit quantity of the bits is greater than or equal to a maximum value of an allowed quantity of MSDU fragments.

The receiving device 2200 further includes the memory 2204, which is configured to store a program and the like. Further, the program may include program code. The program code includes a computer operation instruction. The memory 2204 may include a RAM, and may further include a non-volatile memory, for example, at least one magnetic disk memory. The processor 2202 executes the application program stored in the memory 2204 to implement the receiving state indication method for an A-MPDU.

Embodiment 6

Figure 23:
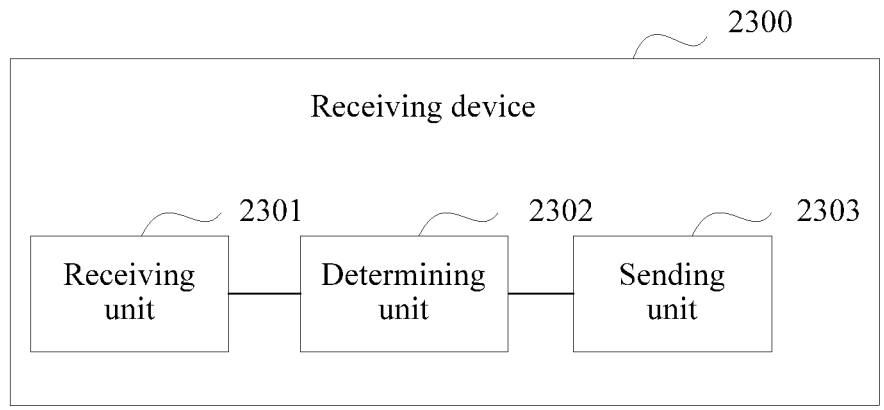
FIG. 23 is a schematic structural diagram of a receiving device according to an embodiment of the present disclosure.

Based on Embodiment 2, the present disclosure further provides a receiving device 2300. The receiving device 2300 may use the method provided in the embodiment corresponding to FIG. 11. Referring to FIG. 23, the receiving device 2300 includes a receiving unit 2301, a determining unit 2302, and a sending unit 2303.

The receiving unit 2301 is configured to receive an A-MPDU sent by a sending device.

The determining unit 2302 is configured to determine an acknowledgement frame used to indicate a receiving state of the A-MPDU received by the receiving unit 2301. The acknowledgement frame includes a BA bitmap field. Each bit in the BA bitmap field is used to indicate a receiving state of one MPDU in the A-MPDU.

The sending unit 2303 is configured to send the acknowledgement frame determined by the determining unit 2302 to the sending device.

Optionally, the acknowledgement frame further includes an A-MPDU identification field. The A-MPDU identification field is used by the sending device to distinguish between the A-MPDU and another A-MPDU sent by the sending device.

Optionally, the A-MPDU identification field includes an SN and an FN that are included in a first MPDU in the A-MPDU.

It should be noted that unit division in this embodiment of the present disclosure is an example, is merely logical function division, and there may be another division in actual implementation. In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments of the present application. The foregoing storage medium includes any medium that can store program code, such as a USB flash drive, a removable hard disk, a ROM, a RAM, a magnetic disk, or an optical disc.

Figure 24:
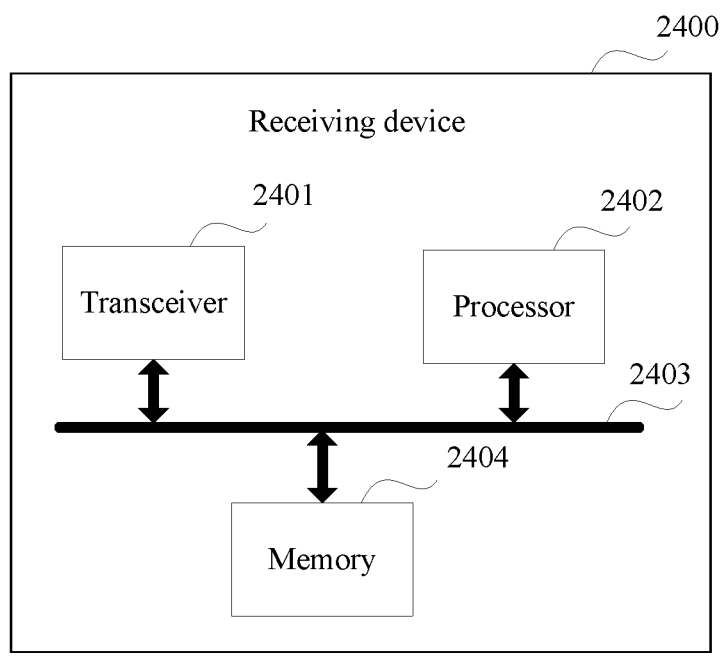
FIG. 24 is a schematic structural diagram of a receiving device according to an embodiment of the present disclosure.

Based on Embodiment 2, the present disclosure further provides a receiving device 2400. The receiving device 2400 may use the method provided in the embodiment corresponding to FIG. 11, and may be a device the same as the receiving device 2300 shown in FIG. 23. Referring to FIG. 24, the receiving device 2400 includes a transceiver 2401, a processor 2402, a bus 2403, and a memory 2404.

The transceiver 2401, the processor 2402, and the memory 2404 are interconnected using the bus 2403. The bus 2403 may be a PCI bus, an EISA bus, or the like. The bus may be classified into an address bus, a data bus, a control bus, and the like. For ease of illustration, only one bold line is used in FIG. 24 to represent the bus 2403, which, however, does not mean that there is only one bus or only one type of bus.

The transceiver 2401 is configured to receive an A-MPDU sent by a sending device.

The processor 2402 is configured to determine an acknowledgement frame used to indicate a receiving state of the A-MPDU received by the transceiver 2401. The acknowledgement frame includes a BA bitmap field. Each bit in the BA bitmap field is used to indicate a receiving state of one MPDU in the A-MPDU.

The transceiver 2401 is further configured to send the acknowledgement frame determined by the processor 2402 to the sending device.

Optionally, the acknowledgement frame further includes an A-MPDU identification field. The A-MPDU identification field is used by the sending device to distinguish between the A-MPDU and another A-MPDU sent by the sending device.

Optionally, the A-MPDU identification field includes an SN and an FN that are included in a first MPDU in the A-MPDU.

The receiving device 2400 further includes the memory 2404, which is configured to store a program and the like. Further, the program may include program code. The program code includes a computer operation instruction. The memory 2404 may include a RAM, and may further include a non-volatile memory, for example, at least one disk memory. The processor 2402 executes the application program stored in the memory 2404 to implement the receiving state indication method for an A-MPDU.

Embodiment 7

Figure 25:
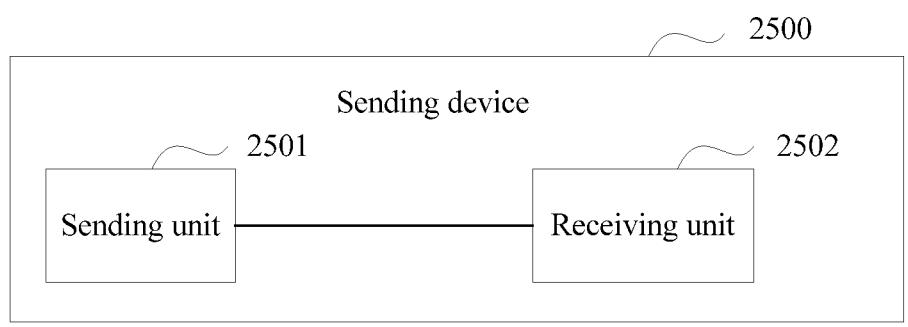
FIG. 25 is a schematic structural diagram of a sending device according to an embodiment of the present disclosure.

Based on Embodiment 3, the present disclosure further provides a sending device 2500. The sending device 2500 may use the method provided in the embodiment corresponding to FIG. 13. Referring to FIG. 25, the sending device 2500 includes a sending unit 2501 and a receiving unit 2502.

The sending unit 2501 is configured to send an A-MPDU including an MSDU fragment to a receiving device, and send a request frame to the receiving device. The request frame is used to request to indicate a receiving state of the MSDU fragment included in the A-MPDU.

The receiving unit 2502 is configured to receive a response frame sent by the receiving device. The response frame is used to indicate the receiving state of the MSDU fragment included in the A-MPDU sent by the sending unit 2501.

Optionally, the request frame includes an SN of the MSDU fragment, and the response frame includes the SN of the MSDU fragment and an indication field used to indicate the receiving state of the MSDU fragment.

Optionally, when the sending unit 2501 sends A-MPDUs including MSDU fragments to multiple receiving devices, the request frame is used to request the multiple receiving devices to separately send a response frame to the sending device. The request frame includes information about an association between an identity of each receiving device of the multiple receiving devices and an SN of an MSDU fragment received by the receiving device.

Optionally, when the sending unit 2501 sends all fragments of an MSDU to the receiving device using at least one A-MPDU, the request frame sent by the sending unit 2501 is used to request to indicate a receiving state of each fragment in the MSDU, and the response frame received by the receiving unit 2502 is used to indicate the receiving state of each fragment in the MSDU.

Figure 26:
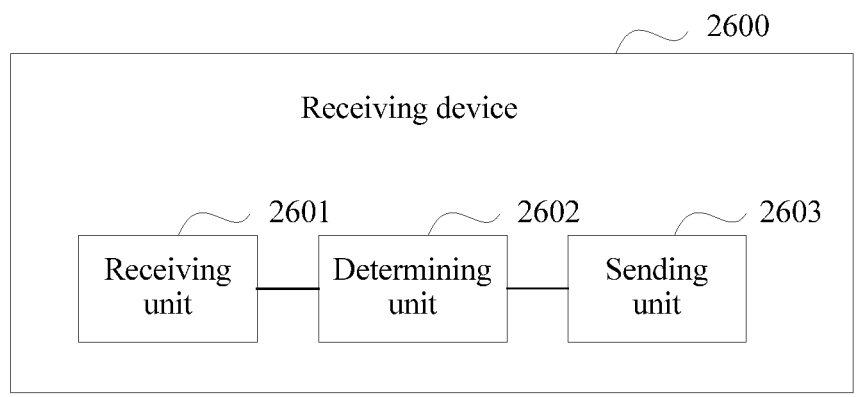
FIG. 26 is a schematic structural diagram of a receiving device according to an embodiment of the present disclosure.

Based on Embodiment 3, the present disclosure further provides a receiving device 2600. The receiving device 2600 may use the method provided in the embodiment corresponding to FIG. 13. Referring to FIG. 26, the receiving device 2600 includes a receiving unit 2601, a determining unit 2602, and a sending unit 2603.

The receiving unit 2601 is configured to receive an A-MPDU that includes an MSDU fragment and that is sent by a sending device, and receive a request frame sent by the sending device. The request frame is used to request to indicate a receiving state of the MSDU fragment included in the A-MPDU.

The determining unit 2602 is configured to determine a response frame. The response frame is used to indicate the receiving state of the MSDU fragment included in the A-MPDU received by the receiving unit 2601.

The sending unit 2603 is configured to send the response frame determined by the determining unit 2602 to the sending device.

Optionally, the request frame includes an SN of the MSDU fragment, and the response frame includes the SN of the MSDU fragment and an indication field used to indicate the receiving state of the MSDU fragment.

Optionally, when the sending device sends A-MPDUs including MSDU fragments to multiple receiving devices, the request frame received by the receiving unit 2601 is used to request the multiple receiving devices to separately send a response frame to the sending device. The request frame includes SNs of MSDU fragments respectively received by the multiple receiving devices.

Optionally, when the receiving unit 2601 receives all fragments of an MSDU that are sent by the sending device using at least one A-MPDU, the request frame received by the receiving unit 2601 is used to request to indicate a receiving state of each fragment in the MSDU, and the response frame sent by the sending unit 2603 to the sending device is used to indicate the receiving state of each fragment in the MSDU.

It should be noted that unit division in this embodiment of the present disclosure is an example, is merely logical function division, and there may be another division in actual implementation. In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments of the present application. The foregoing storage medium includes any medium that can store program code, such as a USB flash drive, a removable hard disk, a ROM, a RAM, a magnetic disk, or an optical disc.

Figure 27:
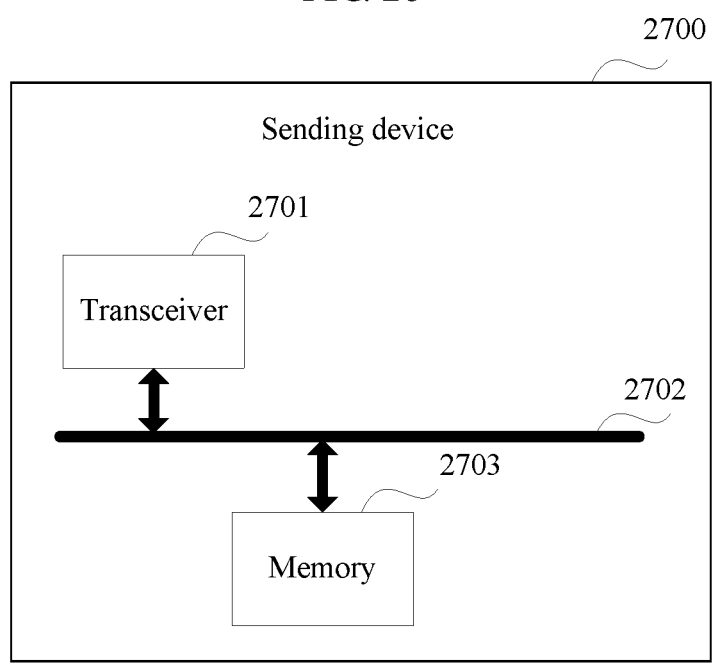
FIG. 27 is a schematic structural diagram of a sending device according to an embodiment of the present disclosure.

Based on Embodiment 3, the present disclosure further provides a sending device 2700. The sending device 2700 may use the method provided in the embodiment corresponding to FIG. 13, and may be a device the same as the sending device 2500 shown in FIG. 25. Referring to FIG. 27, the sending device 2700 includes a transceiver 2701, a bus 2702, and a memory 2703.

The transceiver 2701 and the memory 2703 are interconnected using the bus 2702. The bus 2702 may be a PCI bus, an EISA bus, or the like. The bus 2702 may be classified into an address bus, a data bus, a control bus, and the like. For ease of illustration, only one bold line is used in FIG. 27 to represent the bus 2702, which, however, does not mean that there is only one bus or only one type of bus.

The transceiver 2701 is configured to send an A-MPDU including an MSDU fragment to a receiving device, send a request frame to the receiving device, where the request frame is used to request to indicate a receiving state of the MSDU fragment included in the A-MPDU, and receive a response frame sent by the receiving device, where the response frame is used to indicate the receiving state of the MSDU fragment included in the A-MPDU.

Optionally, the request frame includes an SN of the MSDU fragment, and the response frame includes the SN of the MSDU fragment and an indication field used to indicate the receiving state of the MSDU fragment.

Optionally, when the transceiver 2701 sends A-MPDUs including MSDU fragments to multiple receiving devices, the request frame is used to request the multiple receiving devices to separately send a response frame to the sending device. The request frame includes information about an association between an identity of each receiving device of the multiple receiving devices and an SN of an MSDU fragment received by the receiving device.

Optionally, when the transceiver 2701 sends all fragments of an MSDU to the receiving device using at least one A-MPDU, the request frame sent by the transceiver 2701 is used to request to indicate a receiving state of each fragment in the MSDU, and the response frame received by the transceiver 2701 is used to indicate the receiving state of each fragment in the MSDU.

The sending device 2700 further includes the memory 2703, which is configured to store a program and the like. Further, the program may include program code. The program code includes a computer operation instruction. The memory 2703 may include a RAM, and may further include a non-volatile memory, for example, at least one disk memory.

Figure 28:
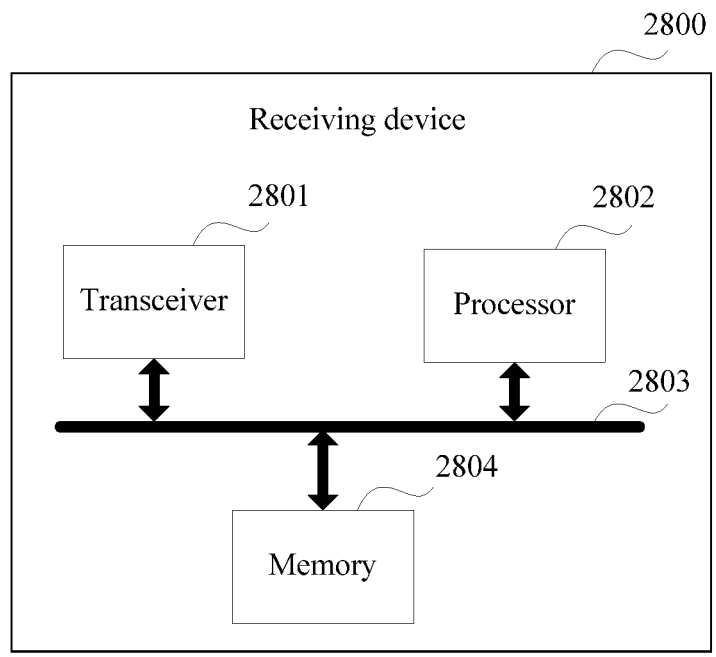
FIG. 28 is a schematic structural diagram of a receiving device according to an embodiment of the present disclosure.

Based on Embodiment 3, the present disclosure further provides a receiving device 2800. The receiving device 2800 may use the method provided in the embodiment corresponding to FIG. 13, and may be a device the same as the receiving device 2600 shown in FIG. 26. Referring to FIG. 28, the receiving device 2800 includes a transceiver 2801, a processor 2802, a bus 2803, and a memory 2804.

The transceiver 2801, the processor 2802, and the memory 2804 are interconnected using the bus 2803. The bus 2803 may be a PCI bus, an EISA bus, or the like. The bus 2803 may be classified into an address bus, a data bus, a control bus, and the like. For ease of illustration, only one bold line is used in FIG. 28 to represent the bus 2803, which, however, does not mean that there is only one bus or only one type of bus.

The transceiver 2801 is configured to receive an A-MPDU that includes an MSDU fragment and that is sent by a sending device, and receive a request frame sent by the sending device. The request frame is used to request to indicate a receiving state of the MSDU fragment included in the A-MPDU.

The processor 2802 is configured to determine a response frame. The response frame is used to indicate the receiving state of the MSDU fragment included in the A-MPDU received by the transceiver 2801.

The transceiver 2801 is further configured to send the response frame determined by the processor 2802 to the sending device.

Optionally, the request frame includes an SN of the MSDU fragment, and the response frame includes the SN of the MSDU fragment and an indication field used to indicate the receiving state of the MSDU fragment.

Optionally, when the sending device sends A-MPDUs including MSDU fragments to multiple receiving devices, the request frame is used to request the multiple receiving devices to separately send a response frame to the sending device. The request frame includes SNs of MSDU fragments respectively received by the multiple receiving devices.

Optionally, when the transceiver 2801 receives all fragments of an MSDU that are sent by the sending device using at least one A-MPDU, the request frame received by the transceiver 2801 is used to request to indicate a receiving state of each fragment in the MSDU, and the response frame sent by the transceiver 2801 to the sending device is used to indicate the receiving state of each fragment in the MSDU.

The receiving device 2800 further includes the memory 2804, which is configured to store a program and the like. Further, the program may include program code. The program code includes a computer operation instruction. The memory 2804 may include a RAM, and may further include a non-volatile memory, for example, at least one disk memory. The processor 2802 executes the application program stored in the memory 2804 to indicate the receiving state of the MSDU fragment in the A-MPDU.

Embodiment 8

Figure 29:
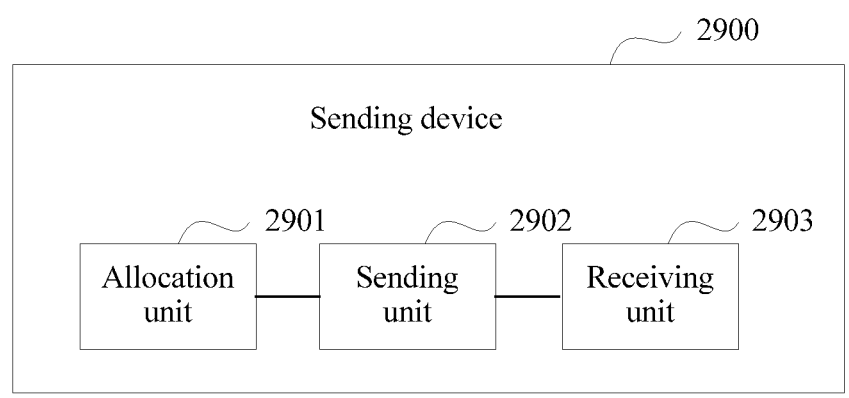
FIG. 29 is a schematic structural diagram of a sending device according to an embodiment of the present disclosure.

Based on Embodiment 4, the present disclosure further provides a sending device 2900. The sending device 2900 may use the method provided in the embodiment corresponding to FIG. 17. Referring to FIG. 29, the sending device 2900 includes an allocation unit 2901, a sending unit 2902, and a receiving unit 2903.

The allocation unit 2901 is configured to allocate an SN to each MPDU in an A-MPDU.

The sending unit 2902 is configured to send the A-MPDU to a receiving device. Each MPDU in the A-MPDU carries the SN allocated by the allocation unit 2901.

The receiving unit 2903 is configured to receive an acknowledgement frame sent by the receiving device. The acknowledgement frame includes an indication field used to indicate a receiving state of each MPDU in the A-MPDU sent by the sending unit 2902. Each bit in the indication field is used to indicate one MPDU in a sequence of SNs in the A-MPDU.

Optionally, the allocation unit 2901 is further configured to allocate the SN to each MPDU in the A-MPDU when at least one MPDU in the A-MPDU is obtained by encapsulating a fragment of a MSDU).

Optionally, the SN is carried in a MAC header of the MPDU.

Optionally, when the acknowledgement frame uses a frame format of a compressed BA frame, the indication field included in the acknowledgement frame is a BA bitmap field in the compressed BA frame.

Optionally, the acknowledgement frame further includes a fragment indication field. The fragment indication field is used to indicate that at least one MPDU in the A-MPDU is obtained by encapsulating a fragment of an MSDU.

Figure 30:
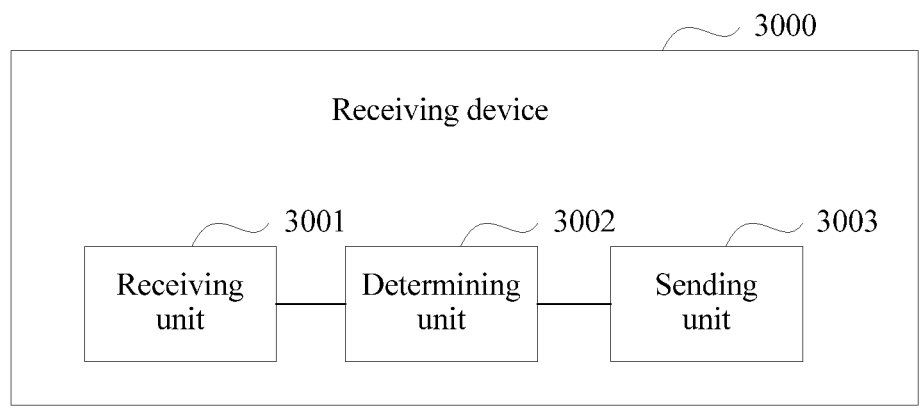
FIG. 30 is a schematic structural diagram of a receiving device according to an embodiment of the present disclosure.

Based on Embodiment 4, the present disclosure further provides a receiving device 3000. The receiving device 3000 may use the method provided in the embodiment corresponding to FIG. 17. Referring to FIG. 30, the receiving device 3000 includes a receiving unit 3001, a determining unit 3002, and a sending unit 3003.

The receiving unit 3001 is configured to receive an A-MPDU sent by a sending device. Each MPDU in the A-MPDU carries an SN of each MPDU.

The determining unit 3002 is configured to determine an acknowledgement frame. The acknowledgement frame includes an indication field used to indicate a receiving state of each MPDU in the A-MPDU received by the receiving unit 3001. Each bit in the indication field is used to indicate one MPDU in a sequence of MPDU SNs in the A-MPDU.

The sending unit 3003 is configured to send the acknowledgement frame determined by the determining unit 3002 to the sending device.

Optionally, the SN is carried in a MAC header of the MPDU.

Optionally, when the acknowledgement frame uses a frame format of a compressed BA frame, the indication field included in the acknowledgement frame is a BA bitmap field in the compressed BA frame.

Optionally, the acknowledgement frame further includes a fragment indication field. The fragment indication field is used to indicate that at least one MPDU in the A-MPDU is obtained by encapsulating a fragment of an MSDU.

It should be noted that unit division in this embodiment of the present disclosure is an example, is merely logical function division, and there may be another division in actual implementation. In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments of the present application. The foregoing storage medium includes any medium that can store program code, such as a USB flash drive, a removable hard disk, a ROM, a RAM, a magnetic disk, or an optical disc.

Figure 31:
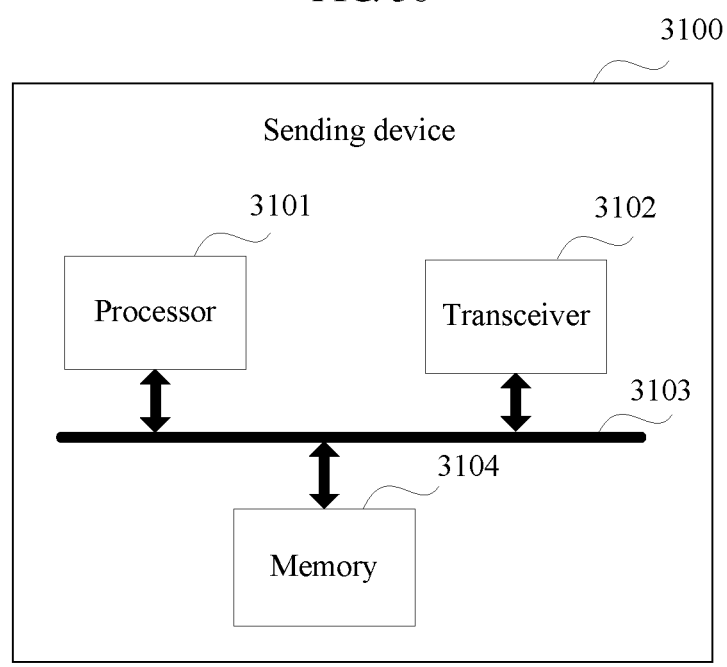
FIG. 31 is a schematic structural diagram of a sending device according to an embodiment of the present disclosure.

Based on Embodiment 4, the present disclosure further provides a sending device 3100. The sending device 3100 may use the method provided in the embodiment corresponding to FIG. 17, and may be a device the same as the sending device 2900 shown in FIG. 29. Referring to FIG. 31, the sending device 3100 includes a processor 3101, a transceiver 3102, a bus 3103, and a memory 3104.

The processor 3101, the transceiver 3102, and the memory 3104 are interconnected using the bus 3103. The bus 3103 may be a PCI bus, an EISA bus, or the like. The bus 3103 may be classified into an address bus, a data bus, a control bus, and the like. For ease of illustration, only one bold line is used in FIG. 31 to represent the bus 3103, which, however, does not mean that there is only one bus or only one type of bus.

The processor 3101 is configured to allocate an SN to each MPDU in an A-MPDU.

The transceiver 3102 is configured to send the A-MPDU to a receiving device, where each MPDU in the A-MPDU carries the SN allocated by the processor 3101, and receive an acknowledgement frame sent by the receiving device. The acknowledgement frame includes an indication field used to indicate a receiving state of each MPDU in the A-MPDU. Each bit in the indication field is used to indicate one MPDU in a sequence of SNs in the A-MPDU.

Optionally, the processor 3101 is further configured to allocate the SN to each MPDU in the A-MPDU when at least one MPDU in the A-MPDU is obtained by encapsulating a fragment of an MSDU.

Optionally, the SN is carried in a MAC header of the MPDU.

Optionally, when the acknowledgement frame uses a frame format of a compressed BA frame, the indication field included in the acknowledgement frame is a BA bitmap field in the compressed BA frame.

Optionally, the acknowledgement frame further includes a fragment indication field. The fragment indication field is used to indicate that at least one MPDU in the A-MPDU is obtained by encapsulating a fragment of an MSDU.

The sending device 3100 further includes the memory 3104, which is configured to store a program and the like. Further, the program may include program code. The program code includes a computer operation instruction. The memory 3104 may include a RAM, and may further include a non-volatile memory, for example, at least one disk memory. The processor 3101 executes the application program stored in the memory 3104 to implement the receiving state indication method for an A-MPDU.

Figure 32:
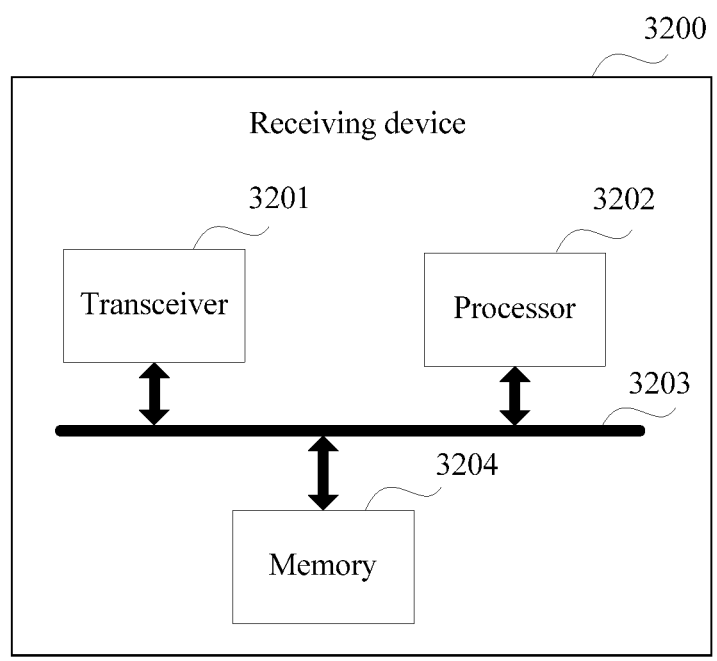
FIG. 32 is a schematic structural diagram of a receiving device according to an embodiment of the present disclosure.

Based on Embodiment 4, the present disclosure further provides a receiving device 3200. The receiving device 3200 may use the method provided in the embodiment corresponding to FIG. 17, and may be a device the same as the receiving device 3000 shown in FIG. 30. Referring to FIG. 32, the receiving device 3200 includes a transceiver 3201, a processor 3202, a bus 3203, and a memory 3204.

The transceiver 3201, the processor 3202, and the memory 3204 are interconnected using the bus 3203. The bus 3203 may be a PCI bus, an EISA bus, or the like. The bus 3203 may be classified into an address bus, a data bus, a control bus, and the like. For ease of illustration, only one bold line is used in FIG. 32 to represent the bus 3203, which, however, does not mean that there is only one bus or only one type of bus.

The transceiver 3201 is configured to receive an A-MPDU sent by a sending device. Each MPDU in the A-MPDU carries an SN of each MPDU.

The processor 3202 is configured to determine an acknowledgement frame. The acknowledgement frame includes an indication field used to indicate a receiving state of each MPDU in the A-MPDU received by the transceiver 3201. Each bit in the indication field is used to indicate one MPDU in a sequence of MPDU SNs in the A-MPDU.

The transceiver 3201 is further configured to send the acknowledgement frame determined by the processor 3202 to the sending device.

Optionally, the SN is carried in a MAC header of the MPDU.

Optionally, when the acknowledgement frame uses a frame format of a compressed BA frame, the indication field included in the acknowledgement frame is a BA bitmap field in the compressed BA frame.

Optionally, the acknowledgement frame further includes a fragment indication field. The fragment indication field is used to indicate that at least one MPDU in the A-MPDU is obtained by encapsulating a fragment of an MSDU.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc ROM (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to embodiments of the present disclosure without departing from the scope of the embodiments of the present disclosure. The present disclosure is intended to cover these modifications and variations provided that they fall within the scope of protection defined by the following claims and their equivalent technologies.

What is claimed is:

1. A receive end, comprising:
a processor; and
a memory storing instructions executable by the processor such that when executed, cause the receive end to:
receive an aggregate-media access control (MAC) protocol data unit (A-MPDU) comprising a MAC protocol data unit (MPDU), wherein the MPDU comprises a sequence number (SN) and a fragment number (FN), wherein the SN identifies a sequence number of a MAC service data unit (MSDU) having an MSDU fragment encapsulated into the MPDU, and wherein the FN identifies a number of the MSDU fragment;
determine that all FN fields in the MPDU of the A-MPDU carry a value of 0; and
send an acknowledgement frame indicating a receiving state of the A-MPDU when all the FN fields in the MPDU of the A-MPDU carry the value of 0 in response to the A-MPDU being received, wherein the acknowledgement frame comprises a receiving state field including a block acknowledgement bitmap field, and wherein each bit in the block acknowledgement bitmap field corresponds to one SN and indicates a receiving state of the MPDU in a sequence of SNs in the A-MPDU.

2. The receive end of claim 1, wherein the acknowledgement frame further comprises a fragment indication field, wherein the fragment indication field indicates that the acknowledgement frame is a second type acknowledgement frame that is different from a first type acknowledgement frame, wherein the first type acknowledgement frame comprises the receiving state field, and wherein each four bits in the receiving state field correspond to one SN.

3. The receive end of claim 2, wherein, when the acknowledgement frame uses a frame format of a multi-user block acknowledgement frame or a compressed block acknowledgement frame, the fragment indication field comprises one or more bits of four reserved bits in a starting sequence control field in a block acknowledgement (BA) information field of the acknowledgement frame.

4. The receive end according to claim 1, wherein the SN is carried in a MAC header of the MPDU.

5. The receive end of claim 1, wherein the A-MPDU does not include an MSDU fragment.

6. A receive end, comprising:
a processor; and
a memory storing instructions executable by the processor such that when executed, cause the receive end to:
receive an aggregate-media access control (MAC) protocol data unit (A-MPDU) comprising at least one MAC protocol data unit (MPDU), wherein the at least one MPDU comprises a second MPDU including a MAC service data unit (MSDU) fragment, wherein the MSDU fragment is a segment of an MSDU, wherein the at least one MPDU comprises a sequence number (SN) and a fragment number (FN), wherein the SN identifies a sequence number of the MSDU having the MSDU fragment encapsulated into the second MPDU, and wherein the FN identifies a number of the MSDU fragment;
determine that an FN field of the at least one MPDU in the A-MPDU does not carry a value of 0; and
send an acknowledgement frame indicating a receiving state of the A-MPDU when the FN field of the at least one MPDU in the A-MPDU does not carry the value of 0 in response to the A-MPDU being received, wherein the acknowledgement frame comprises a receiving state field indicating a receiving state of each MPDU in the A-MPDU in a sequence of SNs, wherein all bits of a fixed quantity of bits in the receiving state field correspond to one SN, and wherein one bit of the fixed quantity of bits in the receiving state field indicates a receiving state of one MPDU in the A-MPDU.

7. The receive end of claim 6, wherein the one bit of the fixed quantity of bits in the receiving state field indicates a receiving state of one MPDU in a sequence of FNs.

8. The receive end of claim 6, wherein the fixed quantity of bits in the receiving state field is 4 bits.

9. The receive end of claim 6, wherein the acknowledgement frame further comprises a fragment indication field, wherein the fragment indication field indicates that the acknowledgement frame is a first type acknowledgement frame which is different from a second type acknowledgement frame, wherein the second type acknowledgement frame comprises a block acknowledgement bitmap field, and wherein each bit in the block acknowledgement bitmap field corresponds to one SN.

10. The receive end of claim 9, wherein, when the acknowledgement frame uses a frame format of a multi-user block acknowledgement frame or a compressed block acknowledgement frame, the fragment indication field comprises one or more bits of four reserved bits in a starting sequence control field in a block acknowledgement (BA) information field of the acknowledgement frame.

11. The receive end of claim 6, wherein the fixed quantity of bits is greater than or equal to a maximum value of an allowed quantity of MSDU fragments of one MSDU.

12. The receive end according to claim 6, wherein the at least one MPDU further comprises a first MPDU, wherein the first MPDU includes one MSDU.

13. The receive end according to claim 6, wherein the SN is carried in a MAC header of the MPDU.

14. A transmit end comprising:
   a processor; and
   a memory storing instructions executable by the processor such that when executed, cause the transmit end to:
      send an aggregate-media access control (MAC) protocol data unit (A-MPDU) to a receive end, wherein the A-MPDU comprises at least one MAC protocol data unit (MPDU), wherein the at least one MPDU comprises a second MPDU including a MAC service data unit (MSDU) fragment, wherein the MSDU fragment is a segment of an MSDU, wherein the at least one MPDU comprises a sequence number (SN) identifying a sequence number of the MSDU having the MSDU fragment encapsulated into the second MPDU, and wherein an FN field of the at least one MPDU in the A-MPDU does not carry a value of 0; and
      receive an acknowledgement frame comprising an indication field indicating a receiving state of each MPDU in the A-MPDU in a sequence of SNs after the A-MPDU is sent to the receive end, wherein all bits of a fixed quantity of bits in the indication field correspond to one SN, and wherein one bit of the fixed quantity of bits in the indication field indicates a receiving state of one MPDU in the A-MPDU.

15. The transmit end of claim 14, wherein the at least one MPDU further comprises a first MPDU, wherein the first MPDU comprises one MSDU.

16. The transmit end of claim 14, wherein the at least one MPDU further comprises a fragment number (FN) identifying a number of the MSDU fragment, and wherein one bit of the fixed quantity of bits indicates a receiving state of one MPDU in a sequence of FNs.

17. The transmit end of claim 14, wherein the fixed quantity of bits is 4 bits.

18. The transmit end of claim 14, wherein the SN is carried in a MAC header of the MPDU.

19. The transmit end of claim 14, wherein the acknowledgement frame further comprises a fragment indication field, and the fragment indication field indicating that the acknowledgement frame is a first type acknowledgement frame which is different from a second type acknowledgement frame, wherein the second type acknowledgement frame comprises a block acknowledgement bitmap field, and each bit in the block acknowledgement bitmap field corresponds to one SN.

20. The transmit end according to claim 19, wherein, when the acknowledgement frame uses a frame format of a compressed block acknowledgement frame or a multi-user block acknowledgement frame, the fragment indication field comprised in the acknowledgement frame is a block acknowledgement bitmap field in the acknowledgement frame.

\* \* \* \* \*

UNITED STATES PATENT AND TRADEMARK OFFICE
CERTIFICATE OF CORRECTION

PATENT NO. : 11,075,717 B2
APPLICATION NO. : 16/747368
DATED : July 27, 2021
INVENTOR(S) : Ming Gan, Le Liu and Yunbo Li Page 1 of 1

It is certified that error appears in the above-identified patent and that said Letters Patent is hereby corrected as shown below:

On the Title Page

Column 2, Page 2, item (56), References Cited, Other Publications: "Asterjadhi, A., et al., LB 200 comment Resolution for Clause 83.5.1.5;" should read "Asterjadhi, A., et al., "LB 200 comment Resolution for Clause 8.3.5.1.5;"

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*